United States Patent
Fong et al.

(10) Patent No.: US 9,317,196 B2
(45) Date of Patent: Apr. 19, 2016

(54) AUTOMATIC ZOOMING FOR TEXT SELECTION/CURSOR PLACEMENT

(75) Inventors: Jeffrey Cheng-Yao Fong, Seattle, WA (US); Jeffery G. Arnold, Sammamish, WA (US); Liang Chen, Bellevue, WA (US); Neil Kronlage, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/207,284

(22) Filed: Aug. 10, 2011

(65) Prior Publication Data

US 2013/0042199 A1 Feb. 14, 2013

(51) Int. Cl.
*G06F 3/048* (2013.01)
*G06F 3/0488* (2013.01)

(52) U.S. Cl.
CPC .... *G06F 3/0488* (2013.01); *G06F 2203/04806* (2013.01)

(58) Field of Classification Search
CPC .................. G06F 3/0481; G06F 2203/04805; G06F 2203/04806; G06F 3/0488; G09G 2340/045
USPC ........... 715/780, 801, 863, 255, 800; 345/661
See application file for complete search history.

(56) References Cited

U.S. PATENT DOCUMENTS

| | | | |
|---|---|---|---|
| 4,190,835 A | 2/1980 | Buynak | |
| 4,633,432 A | 12/1986 | Kitamura | |
| 4,698,625 A | 10/1987 | McCaskill et al. | |
| 4,739,314 A | 4/1988 | McCaskill et al. | |
| RE32,773 E | 10/1988 | Goldwasser et al. | |
| 4,786,894 A | 11/1988 | Furusawa et al. | |
| 5,051,930 A | 9/1991 | Kuwabara et al. | |
| 5,070,478 A | 12/1991 | Abbott | |
| 5,122,953 A | 6/1992 | Uekusa et al. | |
| 5,164,713 A | 11/1992 | Bain | |
| 5,581,670 A | 12/1996 | Bier et al. | |
| 5,583,981 A | 12/1996 | Pleyer | |
| 5,655,093 A | 8/1997 | Frid-Nielsen | |
| 5,666,139 A | 9/1997 | Thielens et al. | |
| 5,666,552 A | 9/1997 | Greyson et al. | |
| 5,714,971 A | 2/1998 | Shalit et al. | |
| 5,754,737 A | 5/1998 | Gipson | |
| 5,778,404 A | 7/1998 | Capps et al. | |
| 5,798,752 A | 8/1998 | Buxton et al. | |

(Continued)

FOREIGN PATENT DOCUMENTS

| | | |
|---|---|---|
| CN | 101419526 | 4/2009 |
| CN | 101526881 | 9/2009 |
| WO | WO 2010/135127 | 11/2010 |

OTHER PUBLICATIONS

Apple, "Vision," <http://www.apple.com/accessibility/iphone/vision.html>, 8 pages, Accessed Aug. 9, 2011.

(Continued)

*Primary Examiner* — Kieu Vu
*Assistant Examiner* — Asteway T Gattew
(74) *Attorney, Agent, or Firm* — Jim Banowsky; Judy Yee; Micky Minhas

(57) ABSTRACT

Disclosed herein are tools and techniques for using a single-finger single touch to zoom content. In one embodiment disclosed herein, a single-finger single touch on a touch screen displaying at least a page of content is detected. At least in response to the detecting the single-finger single touch, a page zoom is performed.

16 Claims, 12 Drawing Sheets

(56) References Cited

U.S. PATENT DOCUMENTS

| | | | |
|---|---|---|---|
| 5,825,352 A | 10/1998 | Bisset | |
| 5,857,212 A | 1/1999 | Van De Vanter | |
| 5,905,486 A | 5/1999 | Brittenham et al. | |
| 5,917,476 A | 6/1999 | Czerniecki | |
| 6,049,326 A | 4/2000 | Beyda et al. | |
| 6,057,827 A | 5/2000 | Matthews | |
| 6,115,482 A | 9/2000 | Sears | |
| 6,137,472 A | 10/2000 | Pekelney et al. | |
| 6,204,848 B1 | 3/2001 | Nowlan et al. | |
| 6,232,969 B1 | 5/2001 | Fawcett | |
| 6,310,610 B1 | 10/2001 | Beaton et al. | |
| 6,313,836 B1 | 11/2001 | Russell, Jr. et al. | |
| 6,340,967 B1 | 1/2002 | Maxted | |
| 6,360,237 B1 | 3/2002 | Schulz et al. | |
| 6,396,474 B1 | 5/2002 | Johnson, Jr. et al. | |
| 6,489,981 B1 | 12/2002 | Jones | |
| 6,661,965 B2 | 12/2003 | Yamamoto | |
| 6,677,928 B1 | 1/2004 | Brodey | |
| 6,683,627 B1 | 1/2004 | Ullmann et al. | |
| 6,693,653 B1 | 2/2004 | Pauly | |
| 6,714,218 B1 | 3/2004 | Bian | |
| 6,714,221 B1 | 3/2004 | Christie et al. | |
| 6,854,090 B2 | 2/2005 | Yu | |
| 6,927,783 B1 | 8/2005 | MacInnis et al. | |
| 6,986,106 B2 | 1/2006 | Soin et al. | |
| 7,006,074 B2 | 2/2006 | Chesters | |
| 7,024,623 B2 | 4/2006 | Higashiyama et al. | |
| 7,030,861 B1 | 4/2006 | Westerman et al. | |
| 7,032,171 B1 | 4/2006 | Carroll | |
| 7,075,512 B1 | 7/2006 | Fabre et al. | |
| 7,091,954 B2 | 8/2006 | Iesaka | |
| 7,098,933 B1 | 8/2006 | Thoemmes et al. | |
| 7,113,178 B1 | 9/2006 | Webb | |
| 7,149,550 B2 | 12/2006 | Kraft et al. | |
| 7,177,797 B1 | 2/2007 | Micher et al. | |
| 7,355,583 B2 | 4/2008 | Beardsley | |
| 7,356,760 B2 | 4/2008 | Jaeger | |
| 7,380,203 B2 | 5/2008 | Keely | |
| 7,423,659 B1 | 9/2008 | Pratley et al. | |
| 7,456,850 B2 | 11/2008 | Meier et al. | |
| 7,489,306 B2 | 2/2009 | Kolmykov-Zotov et al. | |
| 7,586,481 B1 | 9/2009 | Paquette et al. | |
| 7,605,804 B2 | 10/2009 | Wilson | |
| 7,761,807 B2 | 7/2010 | Tapuska | |
| 7,856,605 B2 | 12/2010 | Ording et al. | |
| 7,916,157 B1 | 3/2011 | Kelley et al. | |
| 7,954,054 B2 | 5/2011 | Iwema et al. | |
| 7,966,578 B2 | 6/2011 | Tolmasky et al. | |
| 8,074,181 B2 | 12/2011 | Zaman et al. | |
| 8,117,034 B2 | 2/2012 | Gschwendtner | |
| 8,176,438 B2 | 5/2012 | Zaman et al. | |
| 8,299,943 B2 | 10/2012 | Longe | |
| 8,319,728 B2 | 11/2012 | Geffin et al. | |
| 8,446,392 B2 | 5/2013 | Wang et al. | |
| 8,566,751 B2 | 10/2013 | Kelley et al. | |
| 8,614,665 B2 | 12/2013 | Li | |
| 8,656,282 B2 | 2/2014 | Kulas | |
| 8,656,296 B1 | 2/2014 | Ouyang et al. | |
| 8,656,315 B2 | 2/2014 | Kirkpatrick | |
| 8,826,190 B2 | 9/2014 | Kirkpatrick | |
| 8,922,479 B2 | 12/2014 | Pennington, II et al. | |
| 8,984,436 B1 | 3/2015 | Tseng et al. | |
| 2001/0012437 A1 | 8/2001 | Yamamoto | |
| 2002/0032705 A1 | 3/2002 | Higashiyama et al. | |
| 2002/0059350 A1 | 5/2002 | Iwema et al. | |
| 2002/0063740 A1 | 5/2002 | Forlenza et al. | |
| 2002/0143544 A1 | 10/2002 | Gschwendtner | |
| 2002/0156615 A1 | 10/2002 | Takatsuka et al. | |
| 2003/0095135 A1* | 5/2003 | Kaasila et al. | 345/613 |
| 2003/0103082 A1 | 6/2003 | Carroll | |
| 2004/0019849 A1 | 1/2004 | Weng et al. | |
| 2004/0027398 A1 | 2/2004 | Jaeger | |
| 2004/0056899 A1 | 3/2004 | Sinclair et al. | |
| 2004/0083109 A1 | 4/2004 | Halonen et al. | |
| 2004/0135797 A1 | 7/2004 | Meier et al. | |
| 2004/0179001 A1 | 9/2004 | Morrison et al. | |
| 2004/0225965 A1 | 11/2004 | Garside et al. | |
| 2004/0249627 A1 | 12/2004 | Mirkin | |
| 2005/0008343 A1* | 1/2005 | Frohlich et al. | 386/121 |
| 2005/0057524 A1 | 3/2005 | Hill | |
| 2005/0193321 A1 | 9/2005 | Iwema | |
| 2005/0204295 A1 | 9/2005 | Voorhees et al. | |
| 2005/0270269 A1 | 12/2005 | Tokkonen | |
| 2006/0005151 A1 | 1/2006 | Altman | |
| 2006/0026536 A1 | 2/2006 | Hotelling | |
| 2006/0064640 A1 | 3/2006 | Forlines et al. | |
| 2006/0072137 A1 | 4/2006 | Nishikawa et al. | |
| 2006/0119588 A1 | 6/2006 | Yoon et al. | |
| 2006/0132460 A1 | 6/2006 | Kolmykov-Zotov et al. | |
| 2006/0197756 A1 | 9/2006 | Sun | |
| 2006/0253803 A1 | 11/2006 | Backlund | |
| 2006/0256088 A1 | 11/2006 | Kong | |
| 2007/0061753 A1 | 3/2007 | Ng et al. | |
| 2007/0125633 A1 | 6/2007 | Boillot | |
| 2007/0229466 A1 | 10/2007 | Peng | |
| 2007/0234235 A1 | 10/2007 | Scott | |
| 2007/0260981 A1 | 11/2007 | Kim et al. | |
| 2007/0294644 A1 | 12/2007 | Yost | |
| 2008/0048997 A1 | 2/2008 | Gillespie | |
| 2008/0084400 A1 | 4/2008 | Rosenberg | |
| 2008/0148177 A1 | 6/2008 | Lang et al. | |
| 2008/0165141 A1 | 7/2008 | Christie | |
| 2008/0165142 A1 | 7/2008 | Kocienda | |
| 2008/0174570 A1 | 7/2008 | Jobs et al. | |
| 2008/0184290 A1 | 7/2008 | Tapuska | |
| 2008/0195979 A1 | 8/2008 | Souza et al. | |
| 2008/0259040 A1 | 10/2008 | Ording | |
| 2008/0309632 A1 | 12/2008 | Westerman | |
| 2009/0049398 A1 | 2/2009 | Ahn | |
| 2009/0058830 A1 | 3/2009 | Herz | |
| 2009/0087095 A1 | 4/2009 | Webb | |
| 2009/0109182 A1* | 4/2009 | Fyke et al. | 345/173 |
| 2009/0113353 A1 | 4/2009 | Bansal et al. | |
| 2009/0187846 A1 | 7/2009 | Paasovaara | |
| 2009/0189862 A1 | 7/2009 | Viberg | |
| 2009/0204888 A1 | 8/2009 | Miyamoto | |
| 2009/0217158 A1 | 8/2009 | Bailey | |
| 2009/0228792 A1 | 9/2009 | van Os et al. | |
| 2009/0228842 A1 | 9/2009 | Westerman et al. | |
| 2009/0237421 A1* | 9/2009 | Kim et al. | 345/661 |
| 2009/0249232 A1 | 10/2009 | Lundy | |
| 2009/0249257 A1 | 10/2009 | Bove et al. | |
| 2010/0066764 A1 | 3/2010 | Refai | |
| 2010/0159892 A1* | 6/2010 | Dunnam et al. | 455/413 |
| 2010/0171713 A1 | 7/2010 | Kwok et al. | |
| 2010/0205575 A1 | 8/2010 | Arora et al. | |
| 2010/0235726 A1 | 9/2010 | Ording et al. | |
| 2010/0235729 A1* | 9/2010 | Kocienda et al. | 715/255 |
| 2010/0245261 A1 | 9/2010 | Karlsson | |
| 2010/0295798 A1 | 11/2010 | Nicholson et al. | |
| 2010/0302281 A1* | 12/2010 | Kim | 345/661 |
| 2010/0313126 A1* | 12/2010 | Jung et al. | 715/702 |
| 2010/0328209 A1 | 12/2010 | Nakao | |
| 2010/0328317 A1 | 12/2010 | Lindfors | |
| 2011/0010668 A1 | 1/2011 | Feldstein et al. | |
| 2011/0029917 A1 | 2/2011 | Um | |
| 2011/0035209 A1 | 2/2011 | Macfarlane | |
| 2011/0080341 A1 | 4/2011 | Helmes et al. | |
| 2011/0109581 A1 | 5/2011 | Ozawa et al. | |
| 2011/0134029 A1 | 6/2011 | Park et al. | |
| 2011/0157028 A1* | 6/2011 | Stallings et al. | 345/173 |
| 2011/0239153 A1 | 9/2011 | Carter et al. | |
| 2011/0310026 A1 | 12/2011 | Davis et al. | |
| 2012/0306772 A1* | 12/2012 | Tan et al. | 345/173 |

OTHER PUBLICATIONS

Hillebrand, "How to Make your Windows Mobile Touch Screen Finger-Friendly," Published Date: Apr. 22, 2008, <http://www.mobilitysite.com/2008/04/how-to-make-your-windows-mobile-touch-screen-finger-friendly/>, 4 pages (retrieved Mar. 24, 2010).

"iPhone OS 3.0: How to cut, copy and paste text and images," <http://www.iphonic.tv/2009/06/iphone_os_30_how_to_cut_copy_a.html>, accessed Jun. 18, 2010, 11 pages.

(56) References Cited

OTHER PUBLICATIONS

Microsoft Office, "Select text by using the mouse," <http://office.microsoft.com/en-us/word-help/select-text-HA010096402.aspx#BMI>, accessed Jun. 18, 2010, 4 pages.

"My-T-Touch for Windows Indestructible Keyboards and Indispensable Utilites, Version 1.78, Release 4, User's Guide," Released Date: Nov. 24, 2009, <http://www.imgpresents.com/myttouch/guide/mtta4.pdf>, 187 pages (retrieved Jan. 22, 2010).

Olwal et al., "Rubbing and Tapping for Precise and Rapid Selection on Touch-Screen Displays,"*Proceedings of CHI 2008 (SIGCHI Conference on Human Factors in Computing Systems)*, Florence, Italy, Apr. 5-10, 2008, pp. 295-304.

PCWorld, "Magnifying Glass Pro description, Database Downloads List by 30 Day Change," <http://www.pcworld.com/downloads/file/fid,71819-order,4-c,database/description.html>, Added Feb. 1, 2010, pp. 1-4, Downloaded Mar. 31, 2011.

Ramos et al., "Zliding: Fluid Zooming and Sliding for High Precision Parameter Manipulation," UIST '05, Oct. 23-27, 2005, pp. 143-152.

Stoup, "The New 12" MacBook will have an iPhone-Like Interface," Published Date: Jan. 17, 2007, <http://www.applematters.com/article/the-new-12-macbook-will-have-an-iphonelike-interface/>, 7 pages (retrieved Jan. 22, 2010).

ThomasNet News, "Touch Sensor Features Gesture Recognition Technology," <http://news.thomasnet.com/fullstory/543504>, Published Date: Apr. 28, 2008, 3 pages.

"Virtual On-Screen Keyboard for any Taste," <http://hot-virtual-keyboard.com/>, Published Date: Dec. 15, 2009, 1 page.

International Search Report and Written Opinion dated Feb. 28, 2013, PCT Application No. PCT/US2012/050104, 10 pages.

European Search Report received for European Patent Application No. 12822739.4, Mailed: Oct. 30, 2014, 3 Pages.

Office Action received for European Patent Application No. 12822739.4, Mailed: Nov. 18, 2014, 5 Pages.

First Office Action and Search Report Issued in Chinese Application No. 201280039141.3, Mailed Date: Dec. 29, 2015, 17 Pages.

\* cited by examiner

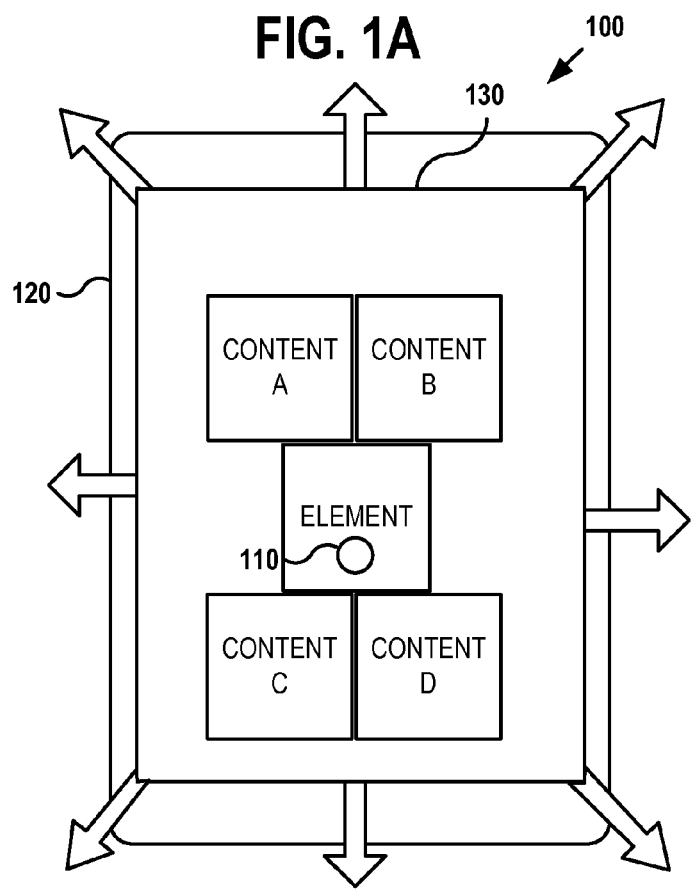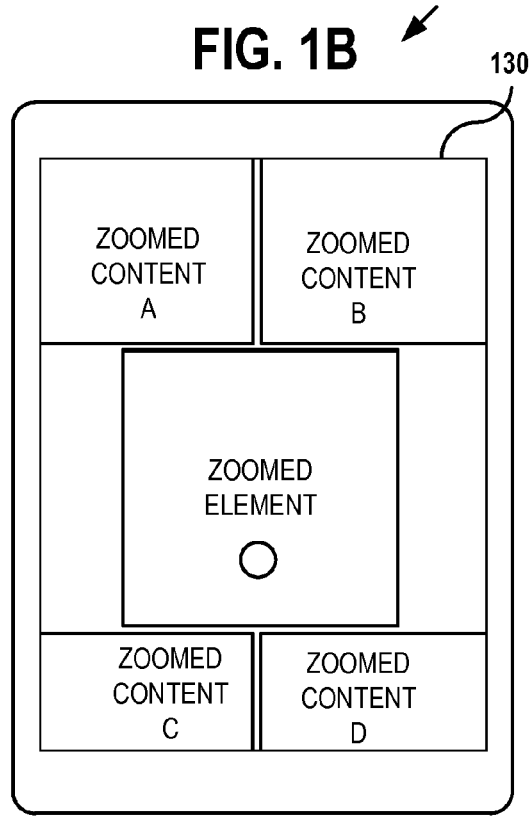

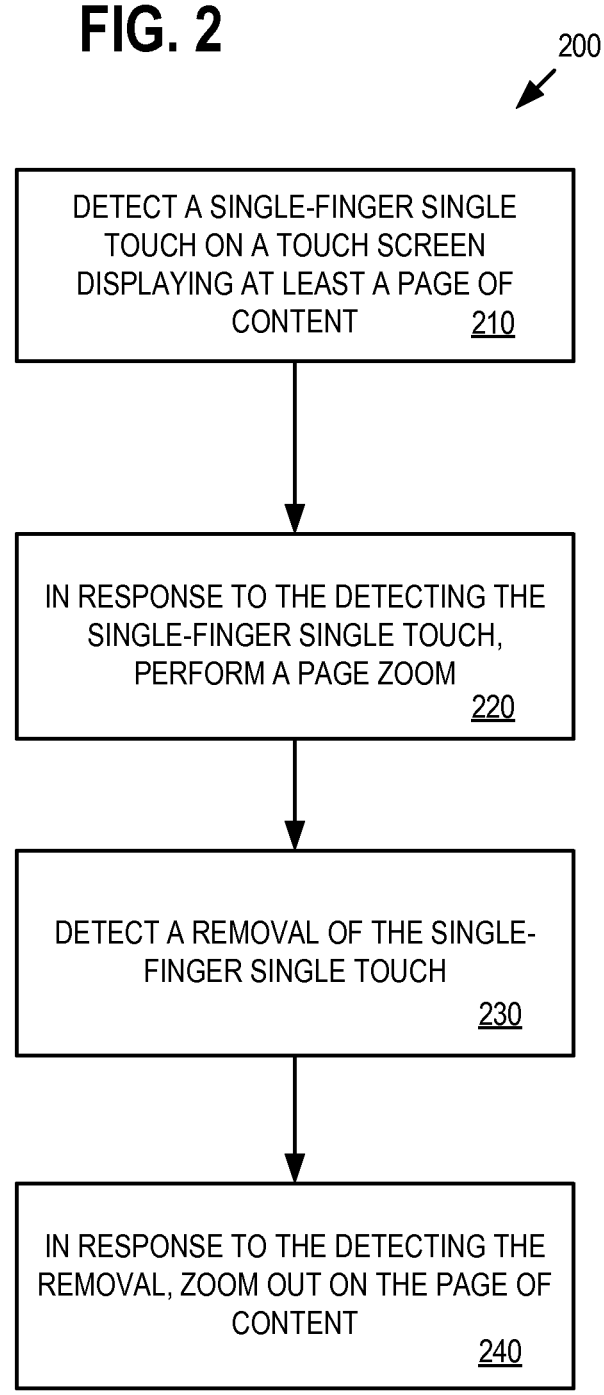

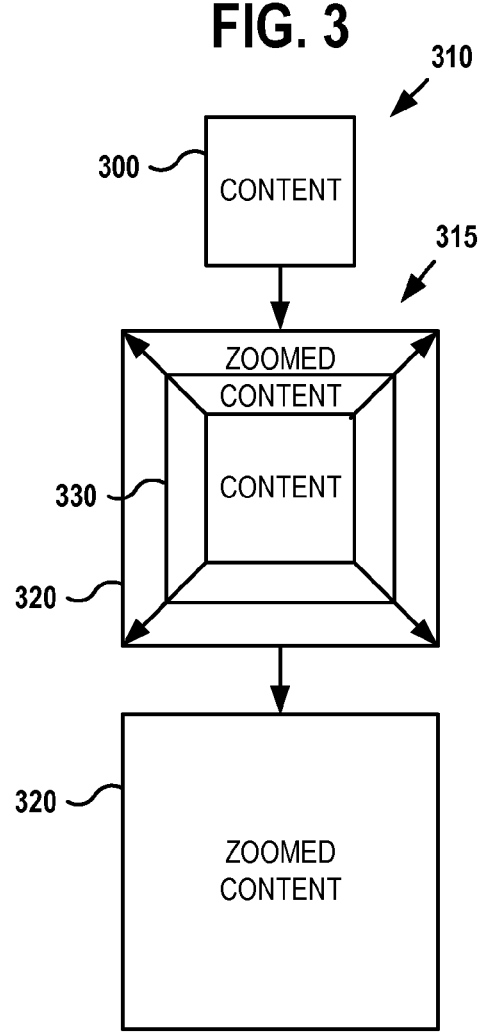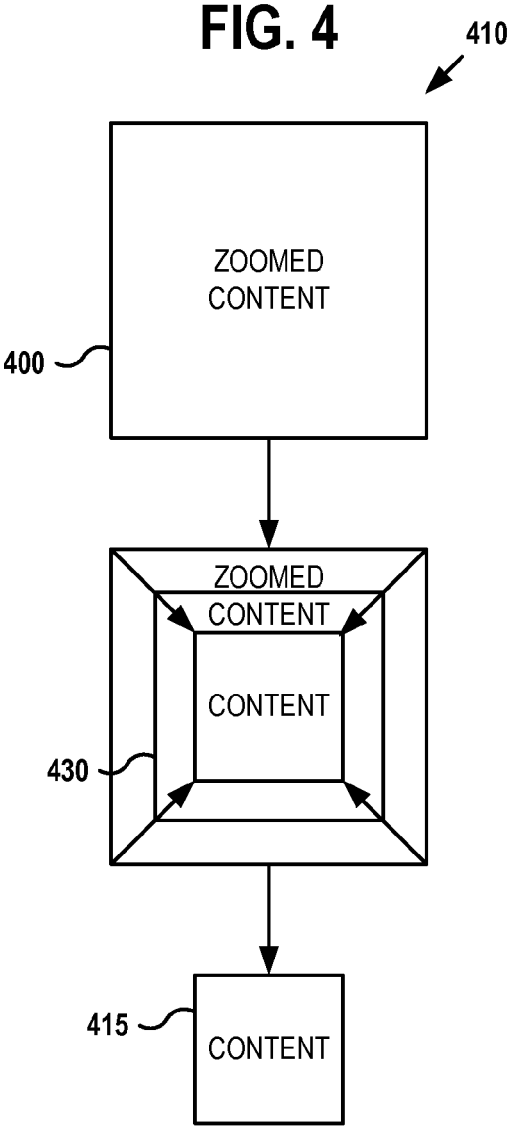

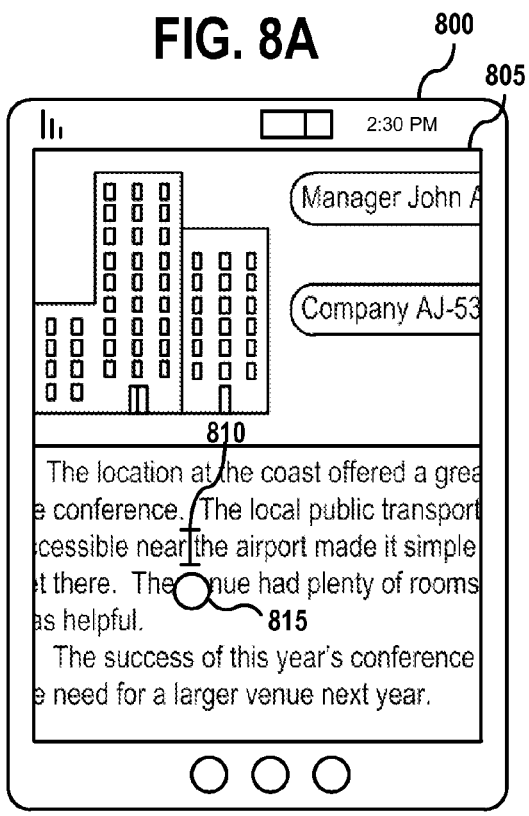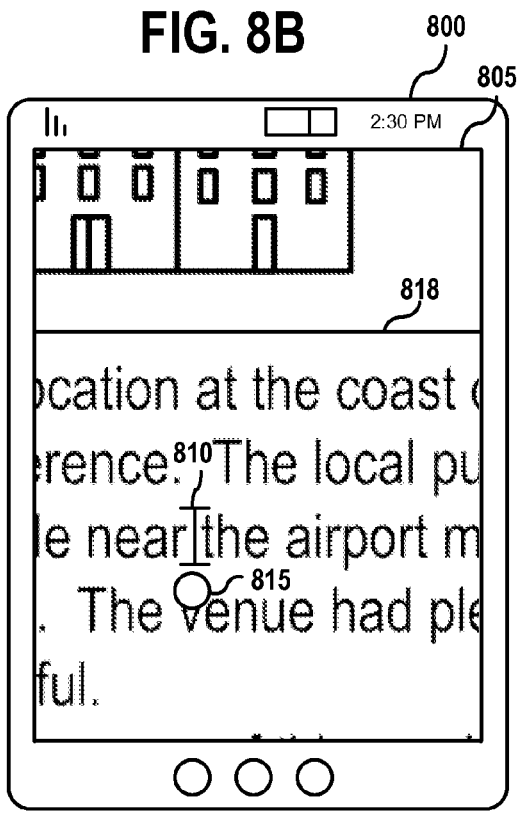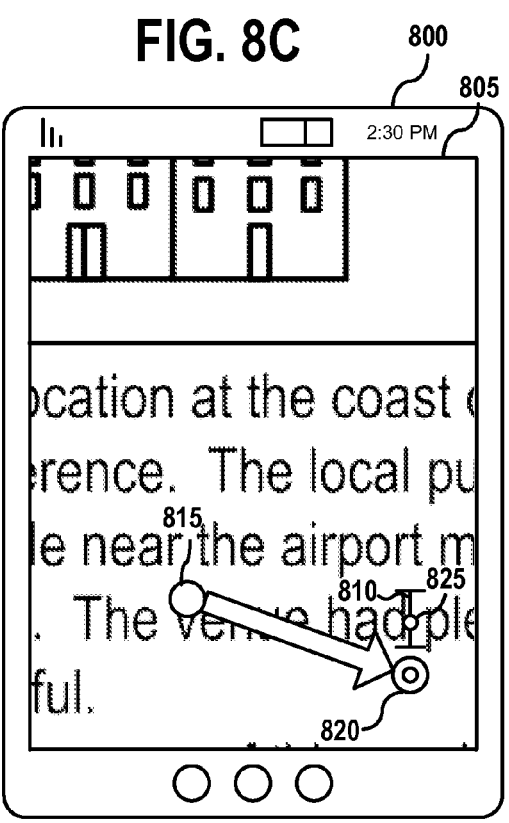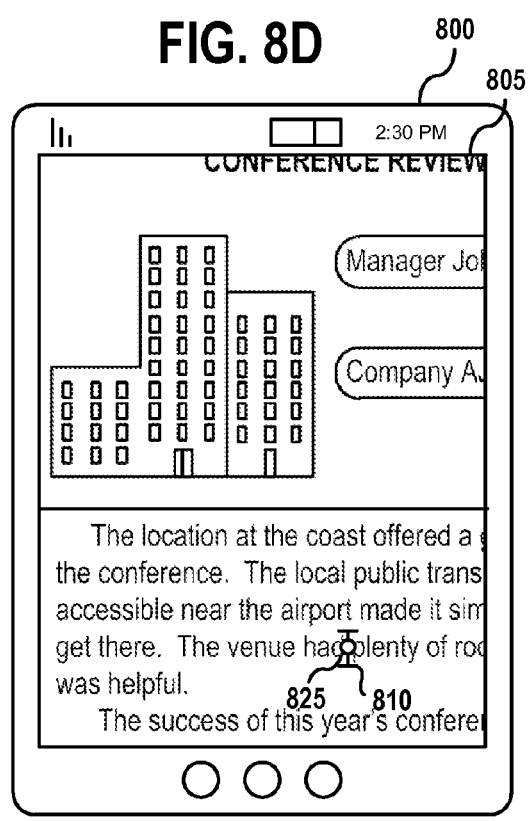

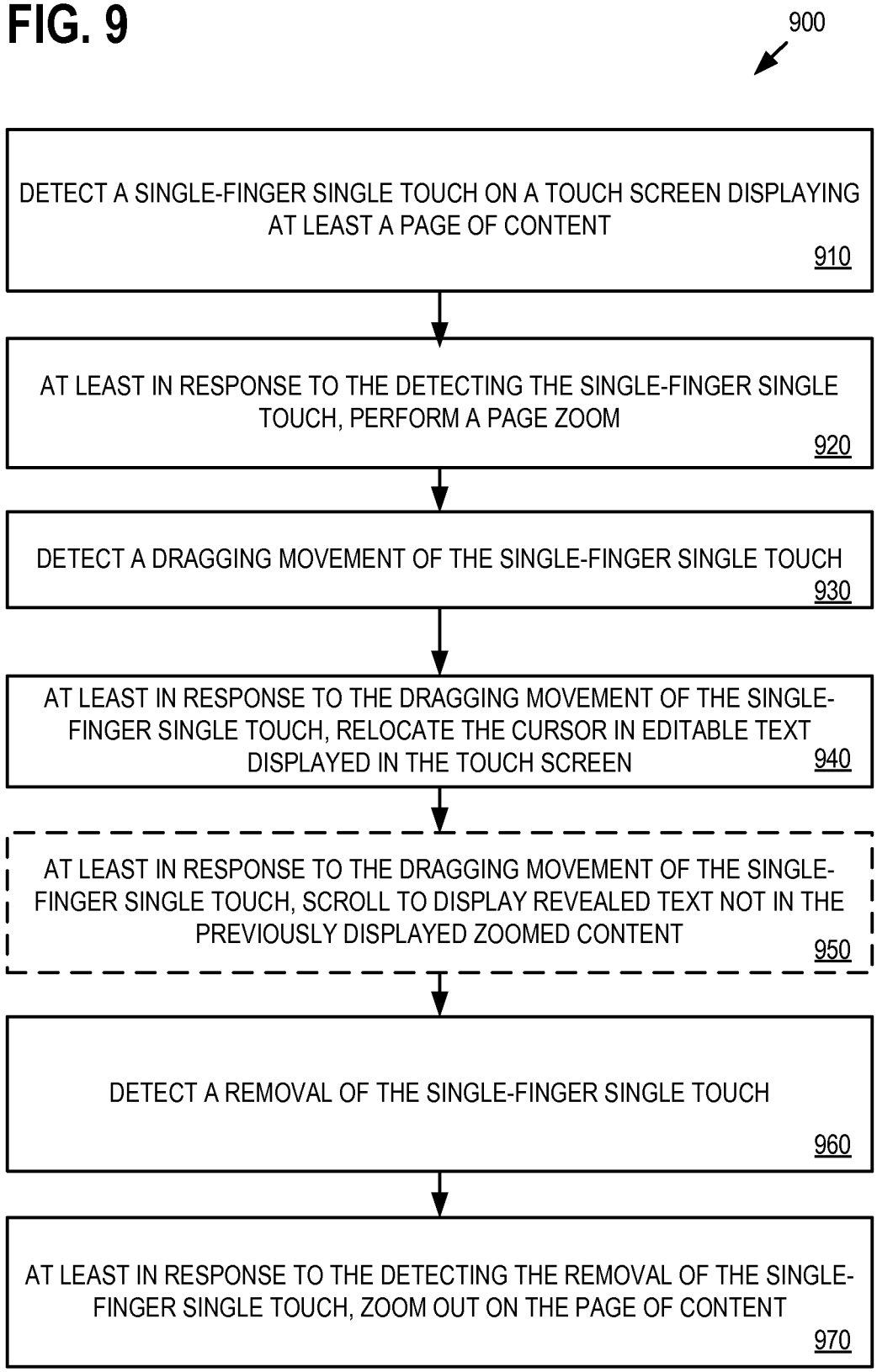

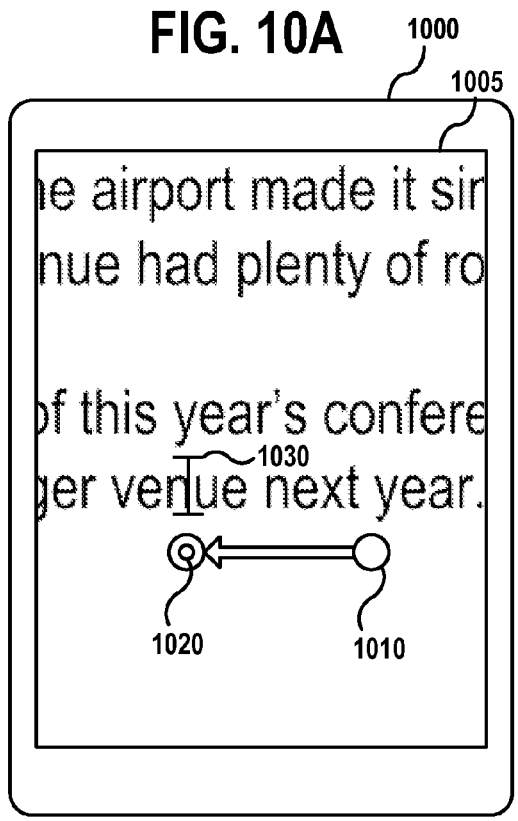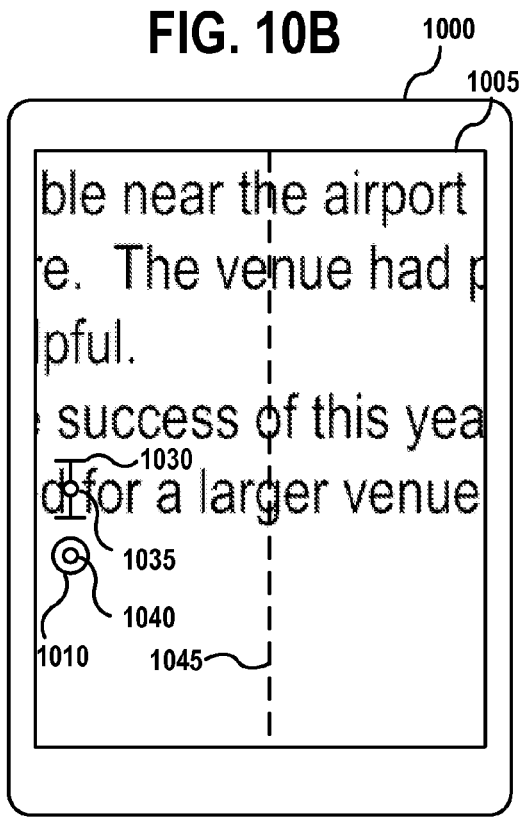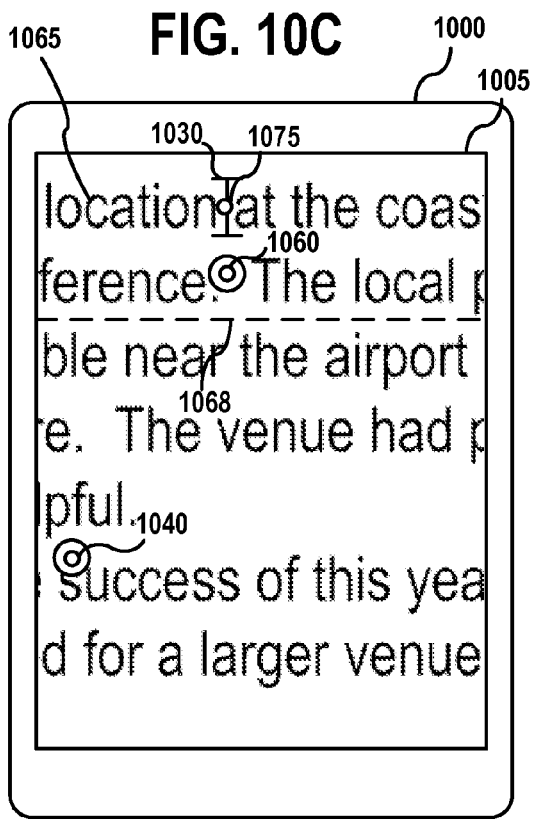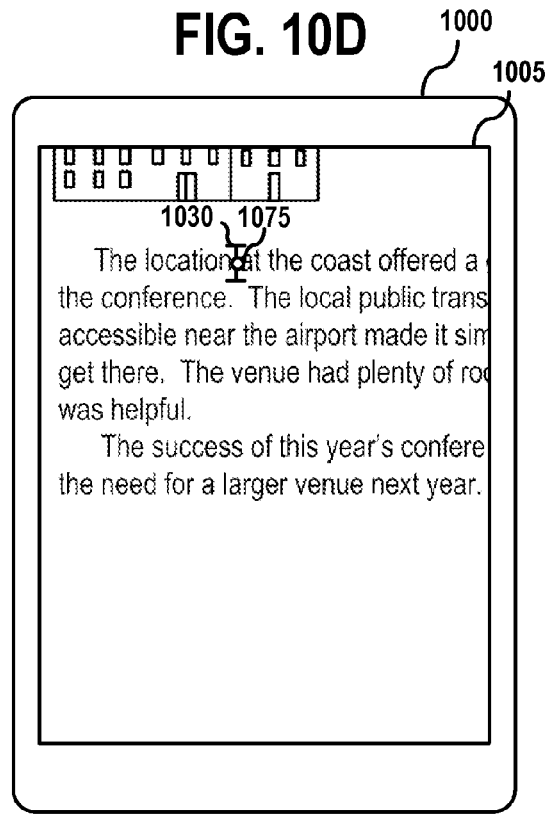

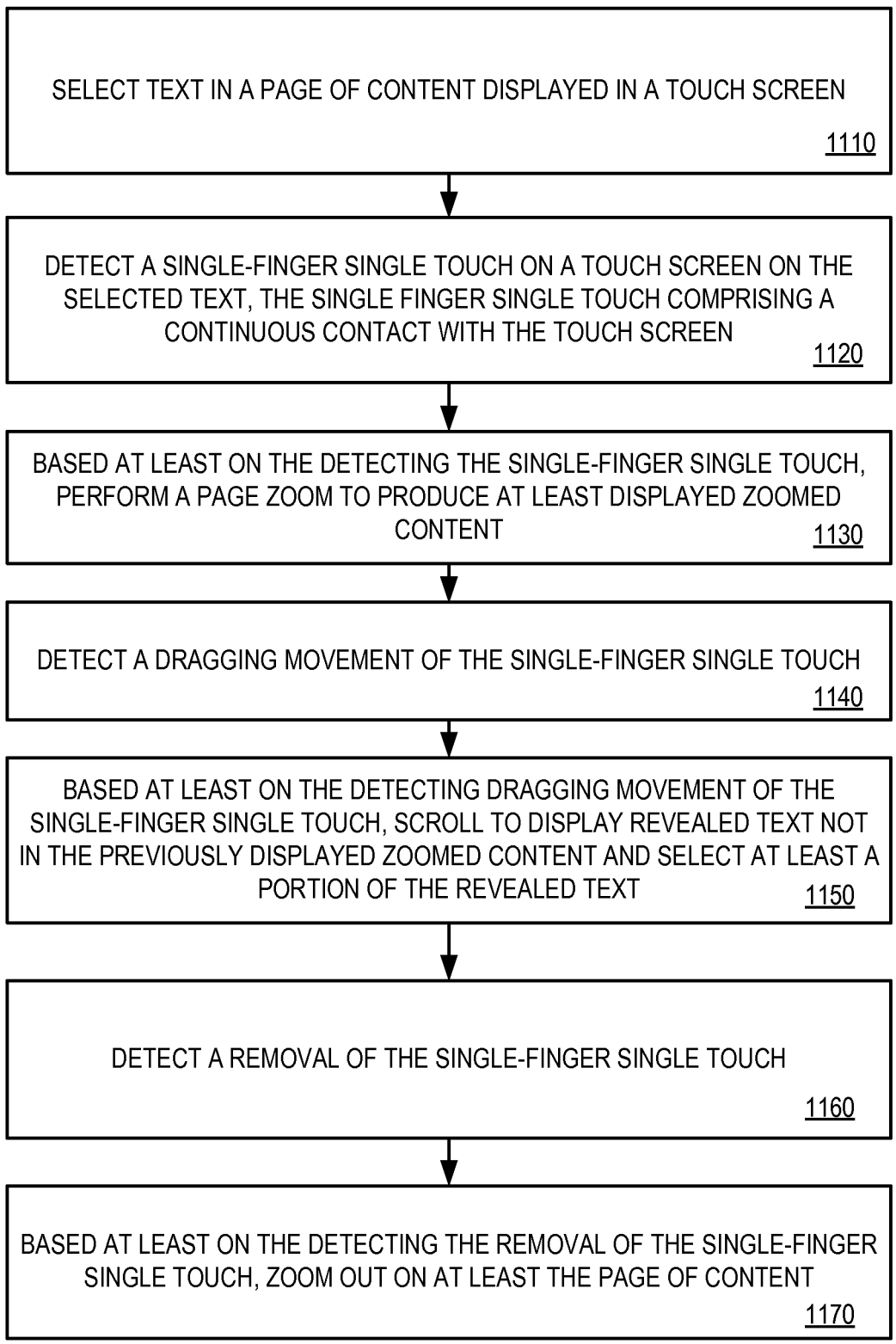

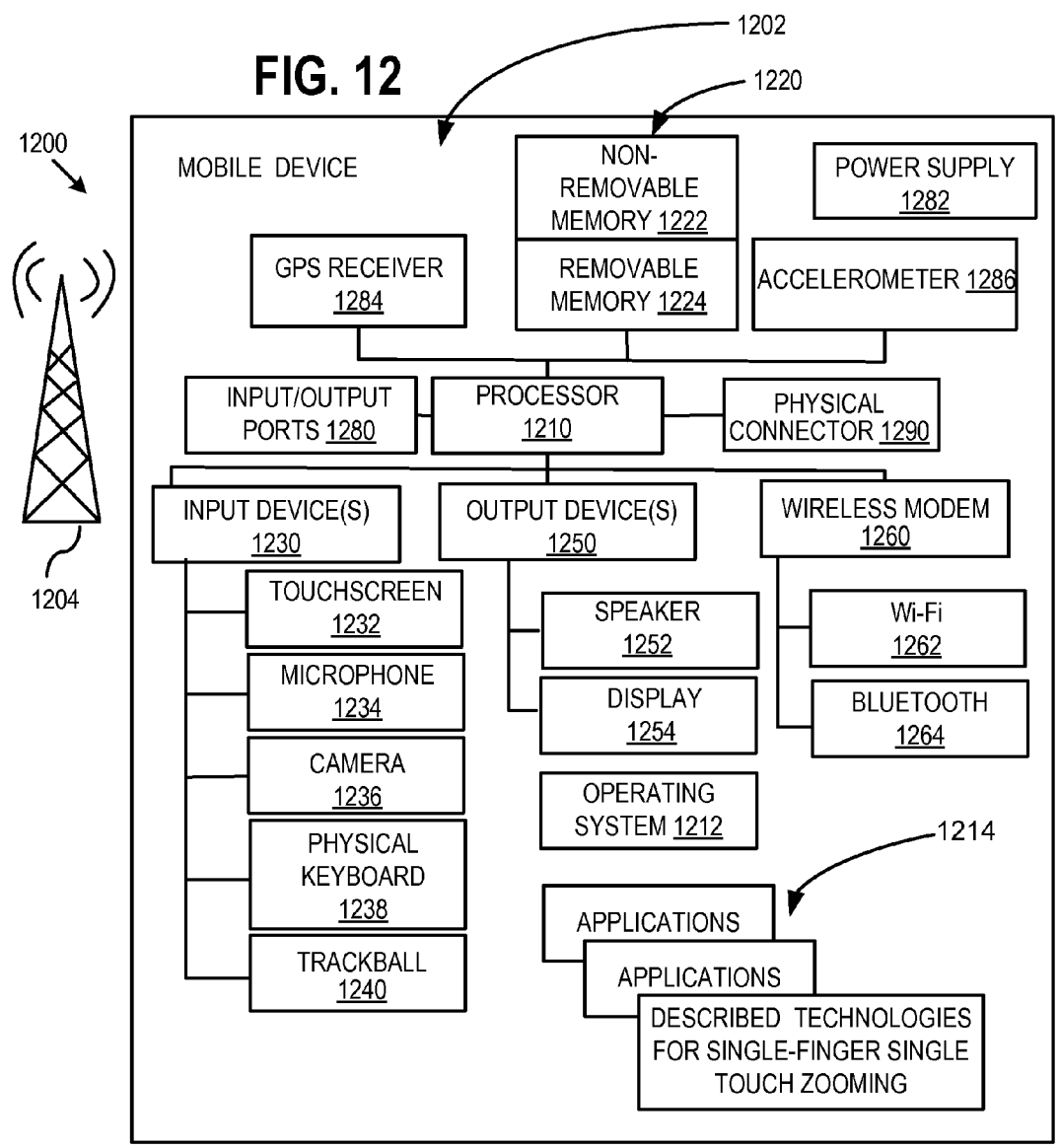

AUTOMATIC ZOOMING FOR TEXT SELECTION/CURSOR PLACEMENT

FIELD

The disclosed embodiments relate generally to user interfaces, and more particularly to a zooming user interface.

BACKGROUND

With the increasing popularity of mobile devices, including cellphone devices, handheld devices, handheld computers, smartphones, PDAs, etc., there is a need for improving the user interface experience.

Mobile devices with capacitive or resistive touch capabilities are well known. Modern mobile phones have evolved over recent years to the point where they now possess a broad range of capabilities. They are not only capable of placing and receiving mobile phone calls, multimedia messaging (MMS), and sending and receiving email, they can also access the Internet, are GPS-enabled, possess considerable processing power and large amounts of memory, and are equipped with high-resolution color liquid crystal displays capable of detecting touch input. As such, today's mobile phones are general purpose computing and telecommunication devices capable of running a multitude of applications. For example, modern mobile phones can run, word processing, web browser, navigation system, media player and gaming applications.

Along with these enhanced capabilities has come a demand for larger displays to provide a richer user experience. Mobile phone displays have increased in size to the point where they can now consume almost the entire viewing surface of a phone. To increase the size of displays any further would require an increase in the size of the phones themselves. Even with the display size being at its maximum, the content on the display remains relatively small. Due to the size of content in the display, a finger touching the display can obfuscate the very content being manipulated, making precise operations difficult. As a result, using touch screen user interfaces can often obscure text and provide inconsistent results.

SUMMARY

Among other innovations described herein, various tools and techniques are disclosed for using a single-finger single touch to zoom content and interact with the zoomed content. According to one aspect of the techniques and tools described herein, a single-finger single touch on a touch screen displaying at least a page of content is detected. At least in response to the detecting the single-finger single touch, a page zoom is performed.

According to another aspect of the techniques and tools described herein, text in a page of content displayed in a touch screen is selected. A single-finger single touch with the touch screen on the selected text is detected and based on the detecting the single-finger single touch, a page zoom is performed. A dragging movement of the single-finger single touch along the touch screen is detected, and based at least on the detecting the dragging movement, revealed text is scrolled into display and at least a portion of the revealed text is selected. A removal of the single-finger single touch is detected and based at least on the detecting the removal, a page of content is zoomed out.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following Detailed Description, which proceeds with reference to the accompanying figures.

BRIEF DESCRIPTION OF THE DRAWINGS

FIG. 1A is a diagram of an exemplary computing device for performing a page zoom in response to a single-finger single touch.

FIG. 1B is diagrams of an exemplary computing device for displaying page zoomed content.

FIG. 2 is a flowchart of an exemplary method for performing a page zoom.

FIG. 3 is a diagram illustrating an exemplary page zoom.

FIG. 4 is a diagram illustrating an exemplary zooming out on a page of content.

FIG. 8A is a diagram of an exemplary single-finger single touch on a touch screen.

FIG. 8B is a diagram of an exemplary page zoom of content in a touch screen.

FIG. 8C is a diagram of an exemplary relocation of a cursor in zoomed editable text.

FIG. 8D is a diagram of an exemplary zoom out on a page of content displaying a relocated cursor.

FIG. 9 is a flowchart of an exemplary method for relocating a cursor in editable text using a page zoom.

FIG. 10A is a diagram of an exemplary moving of a cursor in a touch screen.

FIG. 10B is a diagram of an exemplary horizontal scroll to relocate a cursor.

FIG. 10C is a diagram of an exemplary vertical scroll to relocate a cursor.

FIG. 10D is a diagram of an exemplary zoom out on a page of content displaying a relocated cursor.

FIG. 11 is a flowchart of an exemplary method of zooming to select text.

FIG. 12 is a schematic diagram depicting an exemplary mobile device with which any of the disclosed embodiments can be implemented.

DETAILED DESCRIPTION

Exemplary Computing Device for Page Zooming

Figure 5A:
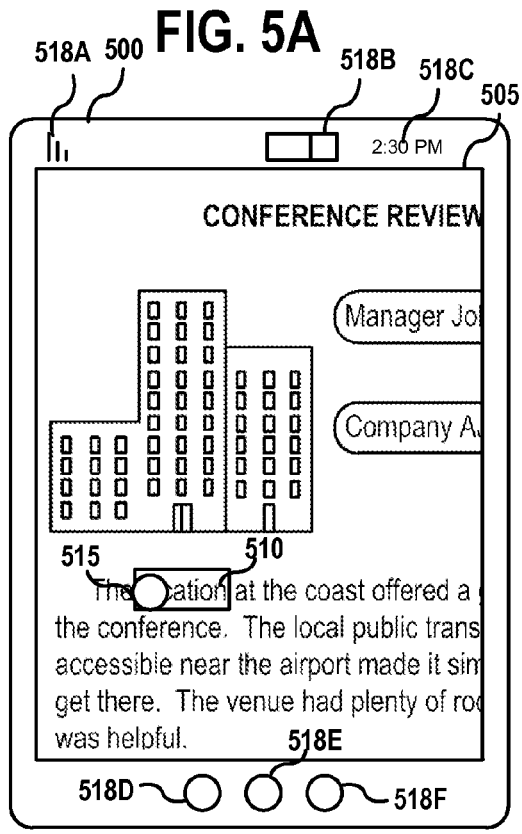
FIG. 5A is a diagram of an exemplary single-finger single touch on a touch screen.

FIGS. 1A-B are diagrams of an exemplary computing device 100 that performs a page zoom in response to a single-finger single touch 110. In FIG. 1A, a user performs a single-finger single touch 110 on a touch screen 120 of the computing device 100 that displays a page of content 130. Because the single-finger single touch 110 on the touch screen 120 is detected by the computing device 100, the computing device 100 performs a page zoom of the page of content 130. The page zoom zooms the page of content 130 to a larger scale as shown in FIG. 1B. By zooming, it is meant that the page of content is shown in greater detail (i.e., zooming in) giving the appearance of being closer up. Often with a page zoom portions of the page are outside of the viewable area and can be seen by using a dragging gesture to scroll portions of the page into the viewable area. In response to detecting a removal of the single-finger single touch the page of content 130 is zoomed out.

Exemplary Method for Producing Zoomed Content

FIG. 2 is a flowchart of an exemplary method for performing a page zoom. A single-finger single touch on a touch screen displaying at least a page of content is detected at block 210. For example, a single-finger single touch can be performed by making a contact at a point on the touch screen and maintaining the contact such that it is unbroken or continuous with the touch screen. At block 220, in response to the detecting the single-finger single touch, a page zoom is performed. At block 230, a removal of the single-finger single touch is detected. At block 240, at least in response to the detecting the removal of the single-finger single touch, the page of content is zoomed out.

Exemplary Page Zooming

FIG. 3 is a diagram illustrating an exemplary performance of a page zoom. At 310 a page of content 300 is displayed at an original size or scale. The page of content 300 in its original size occupies an area. At 315 the page of content 300 is zoomed such that it is increased in size to a larger size to produce a zoomed page of content 320. The page of content 300 is rendered such that it is expanded or stretched to a larger scale or size of the content. When the content 300 is zoomed it can be displayed at a lesser, same, or finer definition. At a finer definition added detail of the content is displayed. In some implementations of a page zoom, the page of content can be scaled in the horizontal direction and/or the vertical direction. In one implementation of a page zoom, the page of content can be scaled equally in both the horizontal direction and the vertical direction. In other implementations, the page of content can be scaled in the vertical direction more or less than in the horizontal direction. The page of content 300 is expanded to the size of the zoomed page of content 320 that occupies a larger area than the area occupied by the original sized page of content 300. The page of content 300 can be zoomed to produce zoomed pages of content of different sizes such as the zoomed page of content 330 at a larger size than the page of content 300 and the page of zoomed content 320 at a larger size than the page of content 330. In some implementations a page of content can be zoomed to a scale of multiple times the size of the page of content (e.g. any positive multiple of the page of content's size). For example, displayed content in the page of content can be scaled to twice its size or scaled by 2 times its original size. In other examples, the page of content can be zoomed a percentage of its original size (e.g., any percentage including within about 20-50% of its original size).

In one implementation of a page zoom, when content in a page of content is being zoomed, the content can be displayed as expanding to various sizes until zoomed to a particular size for the zoomed page of content. In another implementation of a page zoom, when content is being zoomed, the content can be displayed such that it does not expand to various sizes until zoomed to a particular size for the zoomed page of content. For example, the content when zoomed can be displayed at the larger zoomed scale without transitioning through various displayed sizes.

In any of the examples herein, content can include, for example, application content, system continent, editable text in a text editing field, un-editable text (e.g., text displayed in a webpage), icons, fields, application windows, images, pictures, multimedia objects, emoticons, a cursor, a cursor placement tool, or other graphics displayed within a touch screen. In one implementation of application content, application content is content rendered at least using a launched application or software executing on a computing device. For example, a web browser application can display a webpage as application content. In one implementation of system content, system content is content rendered or displayed by an operating system. For example, in a touch screen display for a mobile device, system content can include a cursor placement tool, a battery power indicator, a displayed time, a signal indicator, and other content displayed by a mobile device operating system.

For example, a text editing field can be a field in a display where text can be manipulated for editing. A text edit field can include a cursor, and can allow common text editing functions including but not limited to adding and deleting text in the field. In various implementations of a text editing field, text can be added to and deleted from a text editing field at a position indicated by a cursor in the field. A user can often manipulate the text in a text editing field using a physical keyboard, or a soft keyboard displayed on the touch screen.

FIG. 4 is a diagram illustrating an exemplary zooming out on a page of content. At 410, a zoomed page of content 400 is displayed at a zoomed size or larger scale from an original size or scale of the content shown as the page of content 415. The zoomed page of content 400 in its zoomed size occupies a display area larger than the area occupied by the page of content 415 which is at an original size or unzoomed size. At 415 the zoomed page of content 400 is zoomed out such that it is decreased in size to a smaller size to produce the page of content 415. When zoomed out, the zoomed page of content 400 is rendered such that it is contracted or compacted to a smaller scale of the content. In some implementations of zooming out on a zoomed page of content, the zoomed page of content can be contracted in the horizontal direction and/or the vertical direction. In other implementations, the zoomed page of content can be contracted in the vertical direction more or less than in the horizontal direction. The zoomed page of content 400 is contracted to the size of the page of content 415 as shown that occupies a smaller display area than the display area occupied by the zoomed page of content 400. The page of content 400 can be zoomed out to produce pages of content of different sizes such as the zoomed page of content 430 at a smaller size than zoomed page of content 400 or the page of content 415 at an original size. In some implementations a zoomed page of content can be zoomed out to a scale that is a fraction of its size (e.g. any fraction of the content's size). For example, displayed zoomed content in a zoomed page of content can be zoomed out to a scale of half of its size or scaled down by 2 times. In one implementation, when a zoomed page of content is being zoomed out, the content in the zoomed page of content can be displayed as contracted to various sizes until displayed at a particular original size of the content. In another implementation, when a page of content is being zoomed out, the content in the zoomed page of content can be displayed such that it does not contract to various sizes until displayed at a particular original size. For example, the content when zoomed out can be displayed at the smaller original scale without transitioning through various displayed sizes.

Exemplary Computing Device that Performs a Page Zoom for Text Selection

Figure 5B:
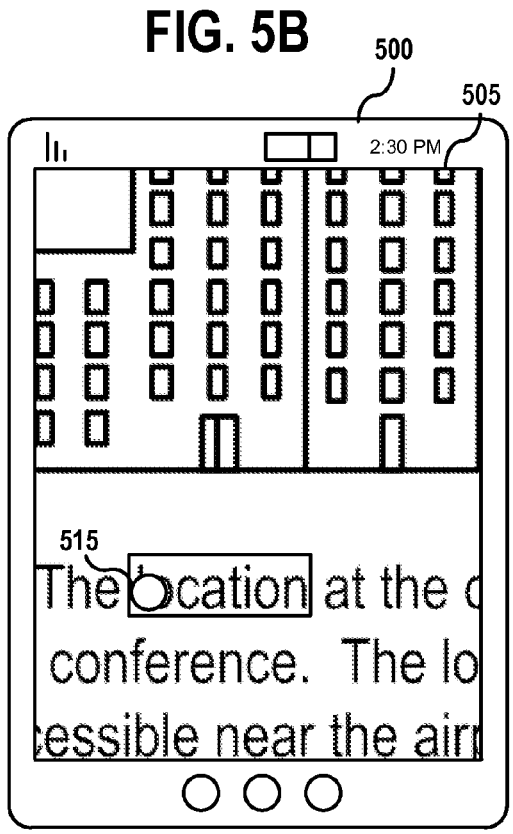
FIG. 5B is a diagram of an exemplary page zoom of content in a touch screen.

FIGS. 5A-D illustrate a computing device 500 that performs a page zoom for text selection. In FIG. 5A, the computing device 500 displays content in a touch screen at an original or default scale such as the page of content 505 which is rendered at least in part by an application and system content 518A-F. A user initiates a single-finger single touch 515 (e.g., by using a press-and-hold gesture) on the touch screen at an initial position on selected text 510 which is the selected word "location". The selected text 510 can be selected using various methods such as by a gesture (e.g., a single tap, double tap, swipe or other gesture), by a stylus press, or some other selection method. Performing the single-finger single touch 515 on selected text 510 can disambiguate the user's intent. Performing the single-finger single touch on the selected text can indicate the user's desire to select additional text with the single-finger single touch, instead of an intent to merely scroll the content in the display without further selection of text. Because the single-finger single touch 515 was detected on the selected text, a page zoom is performed on the page of content 505 in the display producing a zoomed page of content that is displayed at a larger scale as shown in FIG. 5B.

Figure 5C:
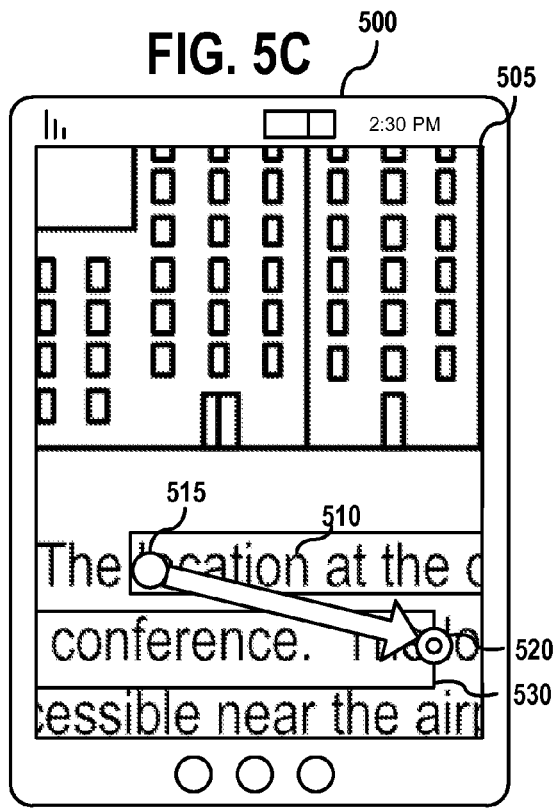
FIG. 5C is a diagram of an exemplary selecting of zoomed text in a touch screen.
Figure 5D:
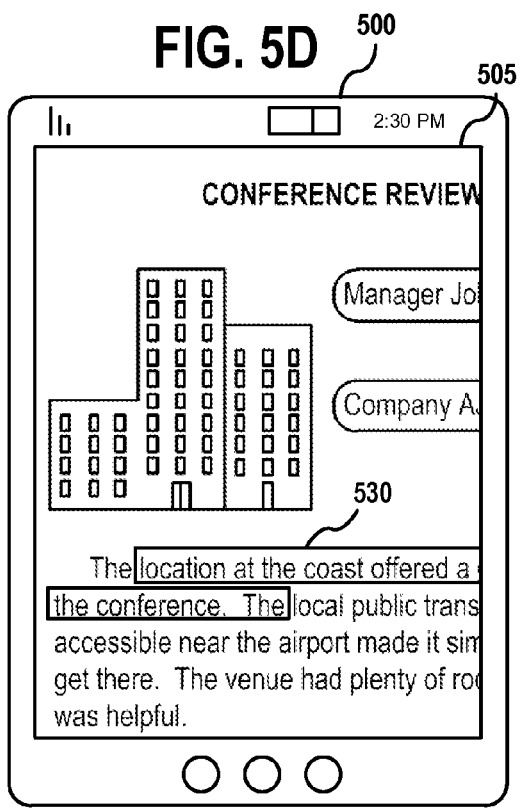
FIG. 5D is a diagram of an exemplary zooming out on a page of content.

In FIG. 5B, the single-finger single touch 515 maintains a continuous contact with the touch screen on the selected text that is included in the zoomed page of content. The selected text's located in the display when zoomed by the page zoom is determined by the single-finger single touch's location, and the selected text is displayed as zoomed under the location of the single-finger single touch in the touch screen. In other, implementations the selected text when zoomed can be displaced a distance from the single-finger single touch, or located in the display not based on the location of the single-finger single touch. As shown in FIG. 5C, to select more text in the display, the user moves the single-finger single touch 515 along the touch screen (e.g., by using a dragging gesture) to position 520 between the words "The" and "local" in the display. Because the single-finger single touch is detected as being moved to position 520 on the touch screen, additional text 530 in the zoomed page of content is selected. The additional text 530 that is selected is selectable text in the lines of text between the first position of the single-finger single touch 515 and the position 520 in the display. The selected text 530 in the lines of text can be selected by wrapping the selection along the lines of text from the selected text 510 to the text located up to the contact with the touch screen. A portion of the text in the page of content that is selected by wrapping is not displayed in the display. After the user moves the single-finger single touch to position 520 to select additional text, the user removes the single-finger single touch (e.g., by lifting up a finger, or stylus off of the touch screen), and the removal of the single-finger single touch is detected indicating that the continuous contact maintained with the touch screen by the single-finger single touch has ended. When the computing device detects the removal of the single-finger single touch, the zoomed page of content is automatically zoomed out to display the page of content including the selected text 530 at the original scale as shown in FIG. 5D. Thus, in the embodiment shown in FIGS. 5A-D content in a touch screen display is zoomed, selected, and zoomed out based on a single-finger single touch of a user, which provides an efficient means for the user to select text in the touch screen display.

Exemplary Method for Selecting Text Using a Page Zoom

Figure 6:
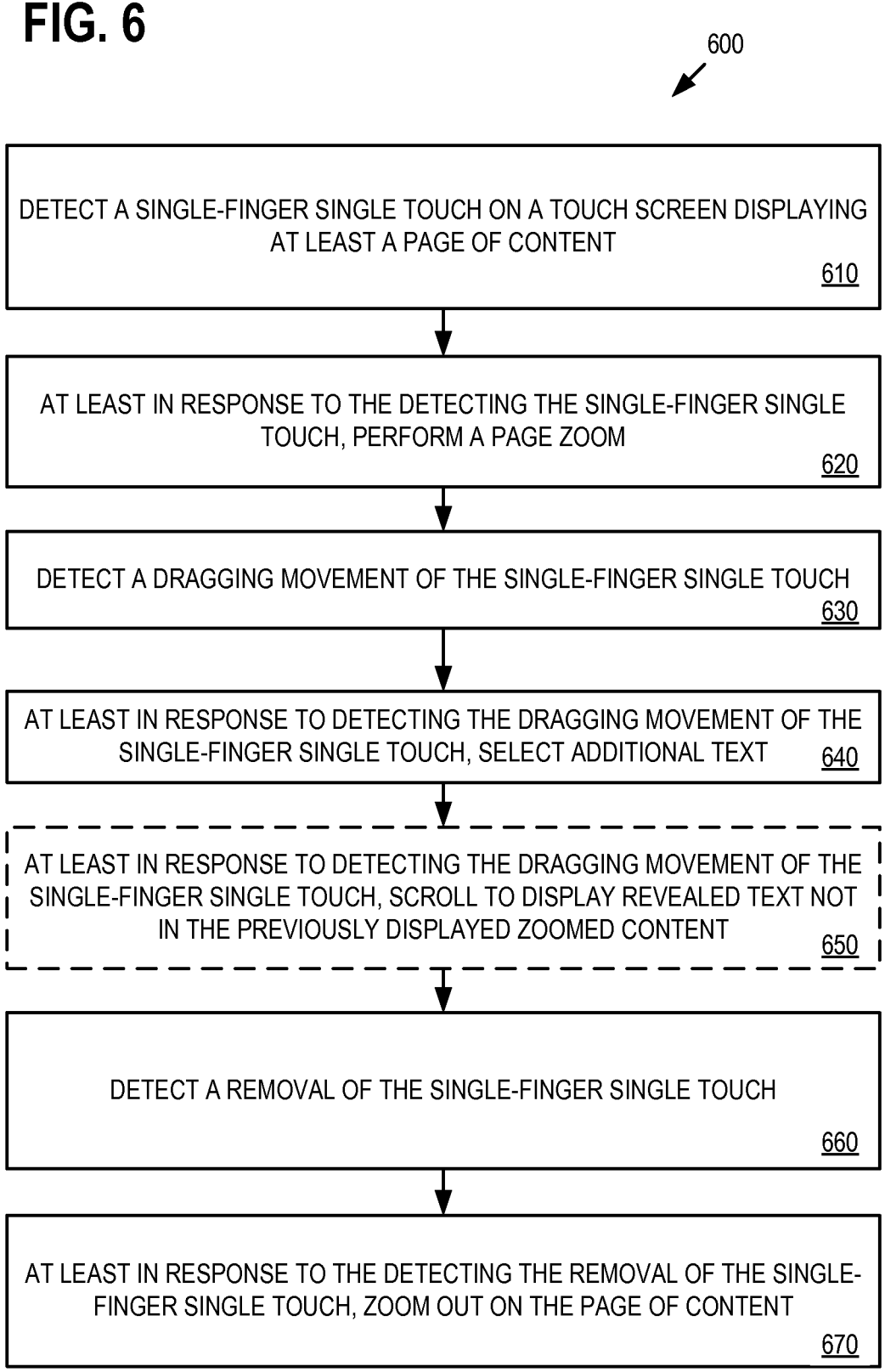
FIG. 6 is a flowchart of an exemplary method for selecting text using a page zoom.

FIG. 6 is a flowchart of an exemplary method for selecting text using a page zoom. In the figure, a single-finger single touch on a touch screen displaying at least a page of content is detected at block 610. A single-finger single touch can be performed by making a contact at a point on the touch screen and maintaining the contact such that it is unbroken or continuous with the touch screen. The point of contact can be at any point on the touch screen. The single-finger single touch can be detected by detecting the contact with the touch screen as a single point of contact and detecting that the contact is maintained as a continuous contact. In one implementation, a single-finger single touch can be moved by moving the single point of contact along the touch screen (e.g., by a drag gesture performed with a finger or stylus) while maintaining the continuous contact with the touch screen. The duration of the single-finger single touch can last from the initial contact until the contact with the touch screen is broken. In some examples a single-finger single touch can include a single-tap gesture, a press-and-hold gesture, or a press-and-hold gesture that is combined with one or more drag gestures such that the press-and-hold gesture and the one or more drag gestures maintain a continuous contact with the touch screen.

The single-finger single touch can be detected by continuously detecting a continuous contact with the touch screen or by periodically checking if a contact with the touch screen is maintained. For example, if consecutive periodic check for a contact at or local to (e.g., near) a previously checked point of contact on the touch screen indicates that a contact is being made at the checked touch screen location, then a continuous contact can be detected. However, if the consecutive periodic check indicates that a contact is not being made at or local to the previously checked point of contact then a break of contact with the touch screen can be detected. A point of contact can be contact with a small portion of the touch screen and detected as a single point of contact. For example, the single point of contact can be derived from an area of contact such as the area under a finger that comes in contact with a touch screen when pressed against the touch screen. In another embodiment, a point of contact can be a representative point of a larger continuous area contacted on the touch screen. A single-finger single touch can be made with a finger, stylus, or other tool capable of contacting a touch screen at a point.

With reference to FIG. 6, at block 620, a page zoom is performed in response to the detecting the single-finger single touch. For example, during a page zoom content in a page of content is automatically zoomed such that it is displayed at the larger scale in the touch screen. In one implementation the single-finger single touch is detected on unselected text displayed in the touch screen and then the automatic page zoom is performed. In a further implementation, in addition to the performing of the page zoom, at least the unselected text contacted by the single-finger single touch is selected because the single-finger single touch was on it. In another implementation, because the single-finger single touch is detected on an active element in the display such as selected text (e.g., one or more selected words), the page zoom is performed. In yet another implementation, the single-finger single touch comprises a continuous contact that is moving along the touch screen and because the moving continuous contact is detected a page zoom is performed.

In one implementation of a page zoom, the page zoom scales or zooms content at a page level such that content in the visible area and possibly content outside the visible area is zoomed in. In another implementation, the content to be page zoomed is included in a page of content and the content is scaled together as a unit. Some of the content of the page of content can be displayed while other content of the page of content is not displayed. For example, a webpage displayed in web browser can be a page of content. A portion of the web page can be displayed while other portions of the web page are not displayed because such portions are outside of the viewable area. However, the portions of the web page that are not displayed can be brought into display such as by scrolling the web page. In some implementations, a page zoom scales or zooms the displayed page of content at page level or display level and does not display a zoomed copy of the content at the same time the original sized content is displayed. That is to say, a page zoom does not produce a magnifying glass or magnifying window in the display that displays a magnified copy of displayed content at the same time as displaying the unmagnified content or a portion of the unmagnified content. In some implementations, a page of content can include a web page in a web browser, a document in a word processing application, a spreadsheet, the content displayed in a display or other page of content displayed in a touch screen by an application or computing device. In some implementations of a page zoom, the system content around the page of content is also zoomed or scaled along with the page of content. For example, if the content of a single-line text edit box is zoomed as a page of content, the content around the text edit box including system content can also be zoomed proportionally so that the text edit box can be displayed at its zoomed scale without being obscured by system content. That is to say, the content (e.g., application content and system content) in the display can be zoomed at display level or a level of the display. In some implementations of performing a page zoom at the display level, the content of the entire display is zoomed such that at least the portions of the content of the entire display located at one or more edges of the display is no longer displayed in the touch screen when zoomed. In another implementation of a page zoom at the display level, a portion of the content in the display is zoomed such that at least one or more edge portions of the portion of content that are located at the edges of the portion of content are no longer displayed in the touch screen when zoomed.

At block 630, a dragging movement of the single-finger single touch is detected. For example, a user pressing a finger against the touch screen can drag the finger along the touch screen surface to a new point along the touch screen maintaining a continuous contact, and the dragging of the finger can be detected. At block 640, in response to the detecting of the dragging movement of the single-finger single touch, additional text is selected. In one example implementation, text is selected based on a location of single-finger single touch on the touch screen. Additional selectable text can be selected between already selected text and a location in the selectable text relative to the location of the single-finger single touch due to the dragging movement. For example, the location in the selectable text relative to the location of the single-finger single touch due to the dragging movement can be the detected single point of contact of the single-finger single touch or a location in the text a predetermined distance displaced from the detected single point of contact. The dragging movement can be detected as moving in one or more directions. For example, contact movement can be in an upward, downward, leftward, rightward, or diagonal direction or a combination of directions. The selection of text can be at the character level, word level, line level or other level of text. The selection of text can include a wrapping selection of text that selects consecutive lines of text up to a predetermined location in the text.

In some implementations, text can be selected by highlighting the text in the touch screen display, and/or changing the displayed color of the text in the display. For example, a word can be highlighted when an area of the display that contains the word is changed in color or designated visually in some other manner. In other implementations, selected text can be displayed with a different color than the color of unselected text, or displayed as underlined. In yet other implementations, selection of text can persist in the touch screen display until the selection is canceled, deleted, or removed. In some implementations selected text can be marked for common editing functions, such as copying, deleting, or other functions.

At block 650, in response to the dragging movement of the single-finger single touch, text not in the previously displayed zoomed content is displayed when the zoomed page of content is scrolled in the touch screen display. For example, while selecting text, whenever the single-finger single touch reaches an area relative to (e.g. very close) or around a predetermined boundary an automatic scrolling can occur, and text scrolled into view can be selected. A predetermined boundary can include the edge of a text box, edge of a display, edge of a display window, edge of touch screen or other boundary in a touch screen. The automatic scrolling can scroll vertically (e.g. Up/Down), horizontally (e.g. Right/Left), diagonally or some other direction depending upon the direction of the dragging motion and one or more boundaries. Scrolling can move undisplayed text into a text editing field for display. The amount of scrolling can be relative to the distance the single-finger single touch is from the predetermined boundary. In one example, where the boundary is the edge of the display of the touch screen, the remainder of the page of content from the location of the single-finger single touch in the direction of the scrolling is mapped proportionally to the distance between the location of the single-finger single touch in the display and the boundary. As the single-finger single touch approaches the boundary the page of content will be proportionally scrolled to display content. When the single-finger single touch is at the boundary the edge of the page of content is displayed. This allows a user to scroll to the edge of a zoomed page of content without breaking contact with a touch screen display.

At block 660, a removal of the single-finger single touch is detected. In one example implementation, the single-finger single touch is removed when the continuous contact with the touch screen is broken. For example, to remove the single-finger single touch, a user performing a single-finger single touch by continuously contacting the touch screen with a finger can lift the finger off the touch screen to break contact with the touch screen. The removal of the single-finger single touch can be detected by detecting that the contact with the touch screen is broken and no longer maintained or continuous.

At block 670, at least in response to the detecting the removal of the single-finger single touch, the page of content is zoomed out. For example, the zoomed page of content is returned to its original size or scale before being zoomed by the page zoom. In other implementations, zooming out a zoomed page of content reduces the scale of the zoomed page of content to a fraction of the scale.

Exemplary Method for Scrolling a Zoomed Content for Text Selection

Figure 7A:
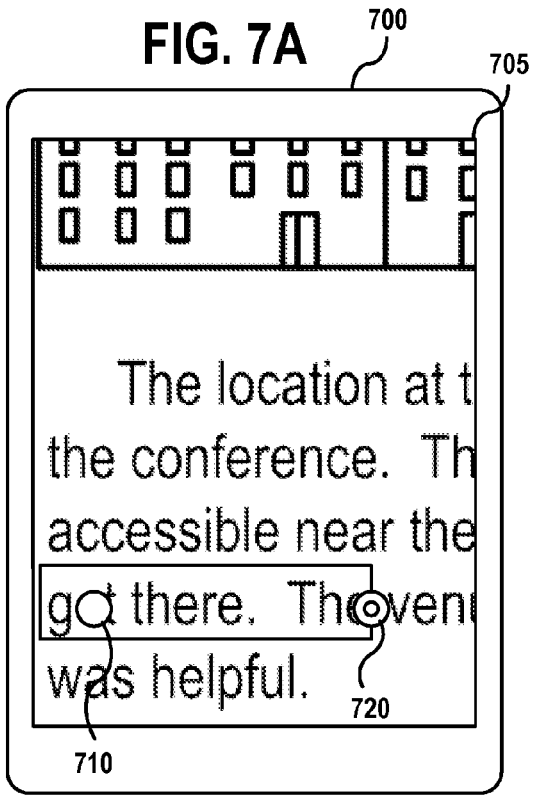
FIG. 7A is a diagram illustrating an exemplary selecting of text in touch screen.
Figure 7B:
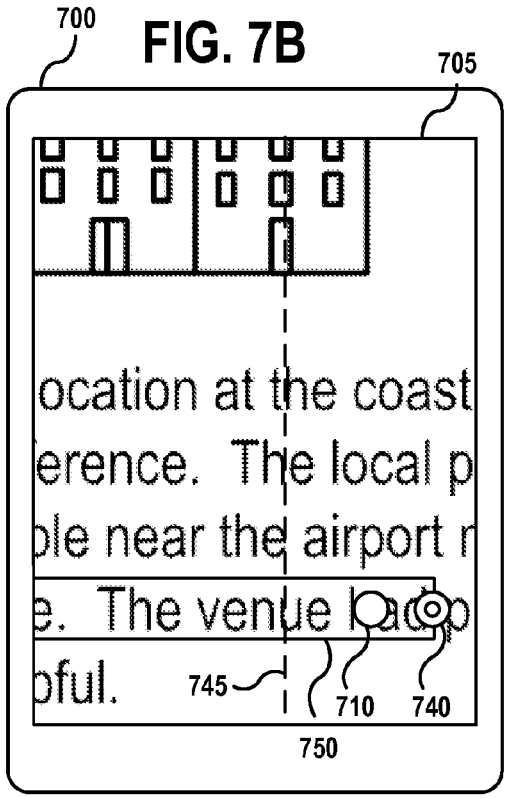
FIG. 7B is a diagram illustrating an exemplary horizontal scrolling to select revealed text in a touch screen.
Figure 7C:
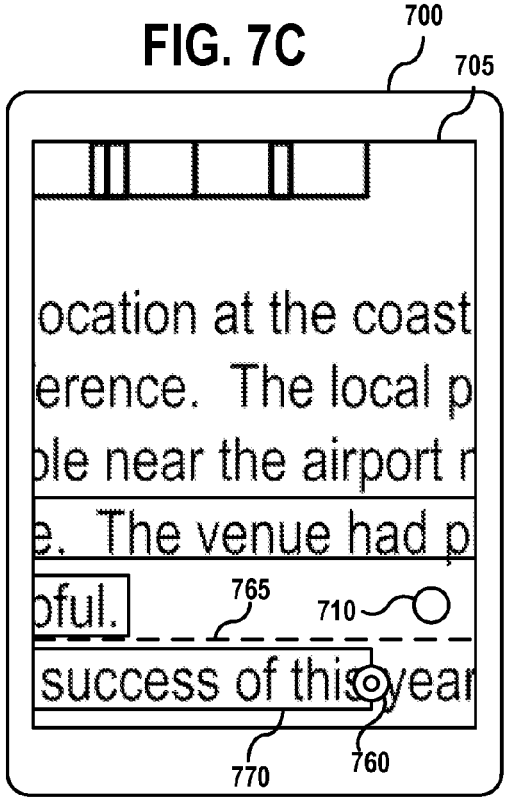
FIG. 7C is a diagram illustrating an exemplary vertical scrolling to select revealed text in a touch screen.
Figure 7D:
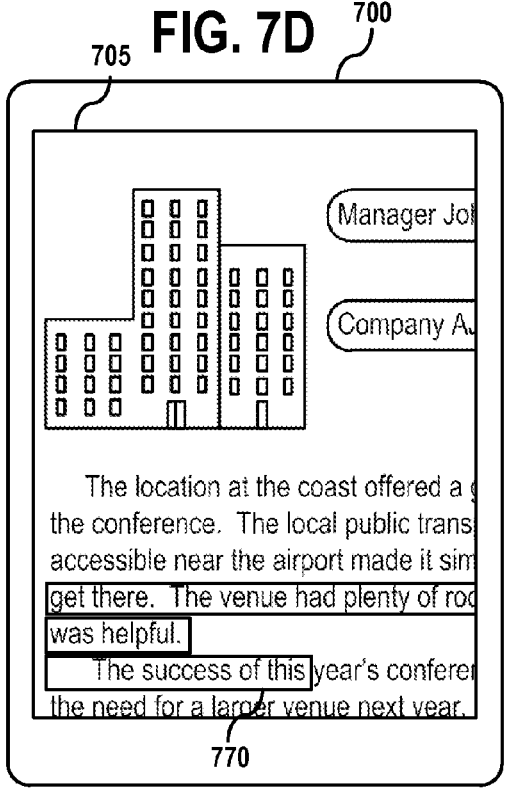
FIG. 7D is a diagram illustrating an exemplary zooming out on a page of content with selected text.

FIGS. 7A-D illustrate a computing device 700 that scrolls a zoomed page of content 705 while text is being selected based on a single-finger single touch. FIG. 7A shows a user performing a single-finger single touch 710 on a touch screen which is moved rightward or horizontally by a dragging movement from an original position to a different position 720 on the touch screen to select text 730. The position 720 is a relative distance to the edge of the displayed content of the zoomed page of content 705. As shown in FIG. 7B, as the single-finger single touch 710 is dragged rightward from position 720 to position 740 which approaches the right edge of the displayed content, the zoomed page of content 705 is scrolled horizontally to the right to reveal content that includes text not previously in the display of the touch screen before the scrolling. The revealed text is shown in content to the right of the dotted line 745 that represents the edge of the previously displayed content in the page of content. A portion of the revealed text 750 is selected from the previously selected text up to text relative to the position 740 of the single-finger single touch. FIG. 7C shows a continued single-finger single touch that selects additional text by scrolling the zoomed page of content 705 in a different direction. In FIG. 7C the single-finger single touch 710 maintains a continuous contact with the touch screen and is moved vertically downward and horizontally leftward from the position 740 in the touch screen to position 760. With this movement the single-finger singe touch approaches a bottom edge of the displayed content and in response to detecting the single-finger single touch is a relative distance from the bottom edge of the displayed content, the zoomed page of content 705 is scrolled vertically downward to reveal content not previously in the display before the scrolling of the zoomed page of content 705. The content not previously in the display before the scrolling is illustrated as being below the dotted line 765 which represents the edge of the previously displayed content. The scrolling allows the user to select a portion of the revealed text 770, by wrapping the selection of text up to the location of the single-finger single touch at position 760. After dragging the single-finger single touch to position 760 to select the additional text revealed by the scrolling, the user removes the single-finger single touch by lifting the user's finger off of the touch screen. In response to detecting the removal of the single-finger single touch, the page of content 705 is zoomed out as shown by FIG. 7D. In FIG. 7D the displayed portion of the page of content 705 is shown at the original scale and displays the visible portion of the previously selected text including the revealed text 770 as selected in the page of content 705.

Exemplary Computing Device that Performs a Page Zoom for Cursor Placement

FIGS. 8A-D. illustrate a computing device 800 that performs a page zoom for cursor placement. In FIG. 8A, the computing device 800 displays content in a touch screen at an original scale such as the page of content 805 which is application content and system content 820A-F. A user performs a single-finger single touch 815 at an original position on the touch screen. The single-finger single touch 815 is detected and in response to the detection a cursor placement tool which displays a cursor 810 is activated. Also, because the single-finger single touch 815 was detected, the page of content 805 and the cursor 810 is zoomed by a page zoom producing zoomed content that is displayed at a larger scale as shown in FIG. 8B. As shown in FIG. 8B, the single-finger single touch 815 is maintained with the touch screen at the original position in the touch screen. To relocate the cursor in editable text in the text edit field 818 included in the content of the display, the user moves the single-finger single touch 815 along the touch screen (e.g., by using a dragging gesture) to position 820 in the touch screen as shown in FIG. 8C. Because the single-finger single touch is detected as being moved to position 820 on the touch screen, the cursor 810 is moved to a position 825 in editable text between the words "had" and "plenty" in the display. The cursor 810 is moved to the position 825 because it corresponds to the position of the single-finger single touch 815. In FIG. 8C the corresponding position of the cursor 810 is displaced a predetermined distance above the position of the single-finger single touch 815. The location in the display where the cursor is moved is a position where text can be edited or entered. After the user moves the single-finger single touch to position 820 to relocate the cursor 810, the user removes the single-finger single touch (e.g., by lifting up a finger, or stylus off of the touch screen) and the removal of the single-finger single touch is detected indicating that the continuous contact with the touch screen has ended. When the computing device detects the removal of the single-finger single touch, the page of content is automatically zoomed out to display content at the original scale with the cursor 810 located in the position 825 in the editable text as shown in FIG. 8D. Thus the user can efficiently place a cursor in editable text by having the text automatically zoom without removing a contact with the touch screen and when the contact is removed the cursor is displayed in the editable text that is automatically zoomed out.

Exemplary Method for Zooming Content for Relocating a Cursor in Editable Text

FIG. 9 is a flowchart of an exemplary method for placing a cursor in editable text using a page zoom. In the figure, a single-finger single touch on a touch screen displaying at least a page of content is detected at block 910. In one example of a single-finger single touch a user can perform a press-and-hold gesture on the touch screen that is detected as a sustained contact with the touch screen at or very near a position on the touch screen.

At block 920, in response to the detecting the single-finger single touch, a page zoom is performed. In one implementation, in addition to performing a page zoom, an element such as a cursor placement tool or cursor is activated and/or grabbed in response to detecting the single-finger single touch. An activated or grabbed element can be controlled functionally or can be moved in the display in response to the motion of the single-finger single touch with the touch screen. In one implementation of a page zoom, the single-finger single touch comprises a continuous contact that is moving along the touch screen and because the moving continuous contact is detected a page zoom is performed. In some implementations of a page zoom the page zoom is performed such that a text edit box is displayed such that it is located based on the location of the single-finger single touch. For example, if a single-finger single touch is detected on a single-line or multi-line text edit or entry field, the text edit or entry field can be positioned in the display relative to the single-finger single touch. This allows for convenient placement of a cursor in the text edit field. In a single-line text edit field implementation, the text edit field can be located either under the single-finger single touch or displaced a predetermined distance from (e.g. above or below) the single-finger single touch. In one implementation the single-line edit box is displaced slightly above the location of the single-finger single touch so that a user's finger does not obscure the single-finger single touch. In an example of a multi-line text edit field, the text edit field can be located such that the location of the single-finger single touch is on a portion of the text edit field or displaced a predetermined distance from the text edit field. In some implementations of performing a single-finger single touch on a text edit field a page zoom can be automatically performed in response to the single-finger single touch on the text edit field. In another implementation, after a single-finger single touch is performed on a text edit field, a page zoom can be automatically performed after a predetermined period of time has passed while the single-finger single touch continues. Pausing or waiting a predetermined period of time before performing a page zoom after a single-finger single touch has been performed can disambiguate the intent of the user in contacting the touch screen display. For example, a user's intent of wanting to select text in the display can be indicated by performing a sustained single-finger single touch longer than a period of time, as opposed to a user's intent of merely wanting to scroll the display, or tap on a button or link which can be performed before the end of the predetermined amount of time or pause. In some examples of a page zoom, the page zoom is centered or zoomed as expanding out from the location in the display that is under or a predetermined distance from the location of the single-finger single touch on the touch screen. In some implementations of a page zoom, content that is not part of the page of content such as system content, or a newly activated cursor or cursor placement tool can be zoomed along with the and proportionally to the zoomed page of content in response to the page of content being zoomed.

At block 930, a dragging movement of the single-finger single touch is detected. In some implementations a drag or drag gesture can be detected when a user drags a finger that is pressed against the touch screen along the surface of the touch screen to a new location on the touch screen while maintaining contact with the touch screen. At block 940, at least in response to the dragging movement of the single-finger single touch, the cursor is relocated in editable text displayed in the touch screen. For example, the cursor can be activated outside of an area where editable text is located in the display and can be moved to an location where editable text is displayed. In some implementations, a user can relocate a grabbed element such as a cursor anywhere in editable text that the grabbed element is allowed. For example, the grabbed element can be placed between characters (e.g., characters of a word), or between words. When a grabbed element is moved it can be displayed under or displaced a predetermined distance from the location of the single-finger single touch.

At block 950, in response to the dragging movement of the single-finger single touch, text not in the previously displayed zoomed content is displayed when the zoomed page of content is scrolled in the touch screen display. For example, a user can drag the single-finger single touch horizontally toward a edge or boundary of the display and the display can be automatically scrolled to display content beyond the displayed content in the direction of the horizontal movement. In some implementations of scrolling zoomed content, scrolling can be allowed in one or more directions and not allowed in one or more other directions. For example, when a single-finger single touch is detected in a single-line text edit field, and the text edit field and surrounding content are zoomed, scrolling in the vertical directions can be locked such that scrolling cannot happen in the vertical directions, and scrolling in the horizontal directions is allowed. In other implementations, no locks are placed on scrolling and scrolling can be allowed in horizontal, vertical and diagonal directions.

At block 960, a removal of the single-finger single touch is detected. For example, a user can remove a finger from contacting the touch screen. At block 970, at least in response to the detecting the removal of the single-finger single touch, the page of content is zoomed out and the cursor is displayed in the relocated position. For example, because the user removed a finger from the touch screen, the content in the display is zoomed out to an original smaller scale and the cursor is displayed in the display in the position it was relocated to in the editable text. In some implementations when the content is zoomed out the location of the displayed content is based on the location of the last position of the single-finger single touch. For example, the page can be zoomed out such that and the displayed content can be content that was zoomed out from or a predetermined distance from the last point of contact with the touch screen of the removed single-finger single touch.

Exemplary Computing Device that Scrolls Zoomed Content for Cursor Placement

FIGS. 10A-D illustrate a computing device 1000 that scrolls a zoomed page of content 1005 while placing a cursor in editable text based on a single-finger single touch. FIG. 10A shows a user performing a single-finger single touch 1010 on a touch screen which is moved leftward by a dragging movement from an original position to a different position 1020 on the touch screen to move a cursor 1030. The position 1020 is a relative distance to the left edge of the displayed content of the zoomed page of content 1005. As shown in FIG. 10B, as the single-finger single touch is dragged leftward from position 1020 as shown in FIG. 10A to position 1040 which approaches the left edge of the displayed content, the zoomed page of content 1005 is scrolled to the left to reveal text not previously in the display of the touch screen before the scrolling. The revealed text is included in revealed content that is to the left of the previously displayed content in the page of content 1005. The revealed text is shown in content to the left of the dotted line 1045 that represents the edge of the previously displayed content in the page of content. The cursor 1030 is moved to a position 1035 in the revealed text between two words of editable text. FIG. 10C shows a continued single-finger single touch 1010 that relocates the cursor 1030. In FIG. 10C the single-finger single touch maintains a continuous contact with the touch screen and is moved upward and rightward from the position 1040 in the touch screen as shown in FIG. 10B to position 1060. With this movement the single-finger singe single touch approaches a top edge of the displayed content and in response to detecting the single-finger single touch is a relative distance from the top edge of the displayed content, the zoomed page of content 1005 is scrolled upward to reveal content 1065 not previously in the display before the scrolling of the zoomed page of content 1005. The content not previously in the display before the scrolling is illustrated as being above the dotted line 1068 which represents the edge of the previously displayed content. The scrolling allows the user to position the cursor 1030 in the revealed text at position 1075 between the displayed words "location" and "at." After dragging the single-finger single touch to position 1060 to place the cursor 1030 in the revealed text, the user removes the single-finger single touch by lifting the user's finger off of the touch screen. In response to detecting the removal of the single-finger single touch, the page of content 1005 is zoomed out as shown by FIG. 10D. In FIG. 10D the displayed portion of the page of content 1005 is shown at the original scale and displays the cursor 1030 in the editable text at the position 1075 between the displayed words "location" and "at" in the page of content 1005.

Exemplary Method for Zooming Content for Text Selection

FIG. 11 is a flowchart of an exemplary method 1100 of zooming to select text. In the example, text in a page of content displayed in a touch screen is selected at block 1110. For example, a user performs a single tap on a word to select the word in the display. At block 1120, a single-finger single touch on a touch screen on the selected text is detected. The single-finger single touch includes a continuous contact with the touch screen. At block 1130, a page zoom is performed based at least on the detecting the single-finger single touch. At block 1140, a dragging movement of the single-finger single touch is detected. Based at least in on the detecting the dragging movement of the single-finger single touch, content in the display is scrolled to display revealed text not in the previously displayed zoomed content and at least a portion of the revealed text is selected. At block 1160, a removal of the single-finger single touch is detected. At block 1170, based at least on the detecting the removal of the single-finger single touch, at least the page of content is zoomed out.

Exemplary Computing Device

FIG. 12 is a system diagram depicting an exemplary mobile device 1200 including a variety of optional hardware and software components, shown generally at 1202. Any components 1202 in the mobile device can communicate with any other component, although not all connections are shown, for ease of illustration. The mobile device can be any of a variety of computing devices (e.g., cell phone, smartphone, handheld computer, tablet computer, laptop computer, personal computer, Personal Digital Assistant (PDA), etc.) and can allow wireless two-way communications with one or more mobile communications networks 1204, such as a cellular or satellite network.

The illustrated mobile device 1200 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components 1202 and support for one or more application programs 1214. The applications 1214 can include the software for the technologies described herein, such as for zooming in response to a single-finger single touch. The application programs can include common mobile computing applications (e.g., email applications, text editing applications, calendars, contact managers, web browsers, messaging applications), or any other computing application.

The illustrated mobile device 1200 can include memory 1220. Memory 1220 can include non-removable memory 1222 and/or removable memory 1224. The non-removable memory 1222 can include RAM, ROM, flash memory, a hard disk, or other well-known memory storage technologies. The removable memory 1224 can include flash memory or a Subscriber Identity Module (SIM) card, which is well known in GSM communication systems, or other well-known memory storage technologies, such as "smart cards." The memory 1220 can be used for storing data and/or code for running the operating system 1212 and the applications 1214. Example data can include web pages, text, images, sound files, video data, or other data sets to be sent to and/or received from one or more network servers or other devices via one or more wired or wireless networks. The memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1200 can support one or more input devices 1230, such as a touch screen 1232, microphone 1234, camera 1236, physical keyboard 1238 and/or trackball 1240 and one or more output devices 1250, such as a speaker 1252 and a display 1254. Other possible output devices (not shown) can include piezoelectric or other haptic output devices. Some devices can serve more than one input/output function. For example, touch screen 1232 and display 1254 can be combined in a single input/output device.

A wireless modem 1260 can be coupled to an antenna (not shown) and can support two-way communications between the processor 1210 and external devices, as is well understood in the art. The modem 1260 is shown generically and can include a cellular modem for communicating with the mobile communication network 1204 and/or other radio-based modems (e.g., Bluetooth or Wi-Fi). The wireless modem 1260 is typically configured for communication with one or more cellular networks, such as a GSM network for data and voice communications within a single cellular network, between cellular networks, or between the mobile device and a public switched telephone network (PSTN).

The mobile device can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components 1202 are not required or all-inclusive, as any components can deleted and other components can be added.

Figure 13:
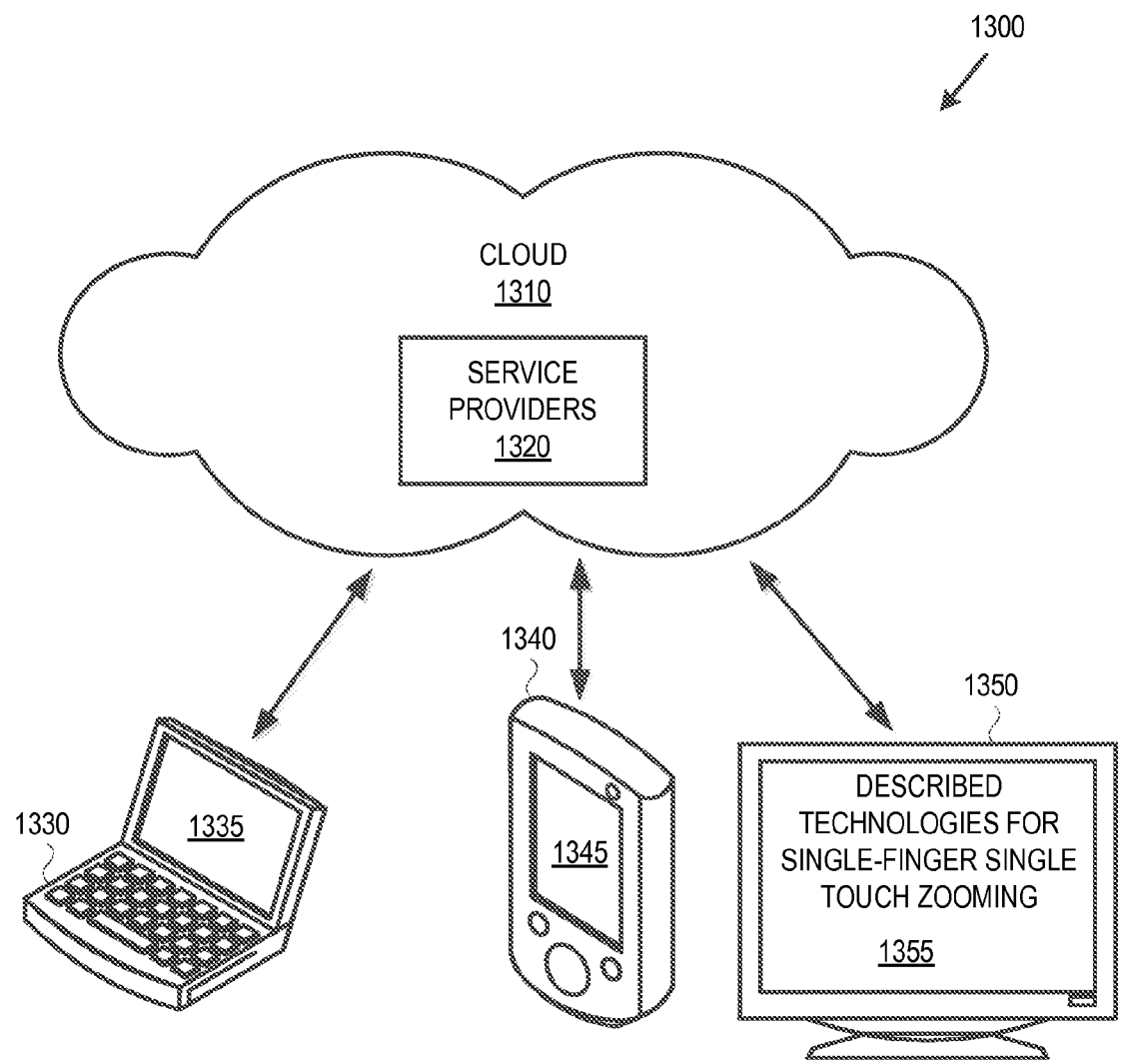
FIG. 13 is a schematic diagram illustrating a generalized example of a suitable implementation environment for any of the disclosed embodiments.

FIG. 13 illustrates a generalized example of a suitable implementation environment 1300 in which described embodiments, techniques, and technologies may be implemented.

In example environment 1300, various types of services (e.g., computing services) are provided by a cloud 1310. For example, the cloud 1310 can comprise a collection of computing devices, which may be located centrally or distributed, that provide cloud-based services to various types of users and devices connected via a network such as the Internet. The implementation environment 1300 can be used in different ways to accomplish computing tasks. For example, some tasks (e.g., processing user input and presenting a user interface) can be performed on local computing devices (e.g., connected devices 1330, 1340, 1350) while other tasks (e.g., storage of data to be used in subsequent processing) can be performed in the cloud 1310.

In example environment 1300, the cloud 1310 provides services for connected devices 1330, 1340 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. Connected device 1340 represents a device with a mobile device screen 1345 (e.g., a small size screen). For example, connected device 1340 could be a mobile phone, smart phone, personal digital assistant, tablet computer, and the like. Connected device 1350 represents a device with a large screen 1355. For example, connected device 1350 could be a television screen (e.g., a smart television) or another device connected to a television (e.g., a set-top box or gaming console) or the like. One or more of the connected devices 1330, 1340, 1350 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the cloud 1310 can provide services for one or more computers (e.g., server computers) without displays.

Services can be provided by the cloud 1310 through service providers 1320, or through other providers of online services (not depicted). For example, cloud services can be customized to the screen size, display capability, and/or touch screen capability of a particular connected device (e.g., connected devices 1330, 1340, 1350).

In example environment 1300, the cloud 1310 provides the technologies and solutions described herein to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs (e.g., a DVD, or CD), volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, Media Center Markup Language or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method comprising:
   in a first zoom scale, selecting text on a page using a first touch gesture on a touch screen;
   detecting a second touch gesture on the touch screen displaying at least a page of content in the first zoom scale, wherein the second touch gesture is a single-finger single touch, the single-finger single touch being on the selected text displayed in the page of content in the first zoom scale;
   at least in response to the detecting the single-finger single touch, performing a page zoom that produces at least displayed zoomed content in a second zoom scale;
   without detecting removal of the single-finger single touch from the touch screen, detecting a dragging movement of the single-finger single touch on the displayed zoomed content in the second zoom scale;
   at least in response to the detecting the dragging movement of the single-finger single touch, detecting if the single-finger single touch is near to a predetermined boundary of the displayed zoomed content in the second zoom scale;

in response to the detecting that the single-finger single touch is near to the predetermined boundary of the displayed zoomed content in the second zoom scale, scrolling to display at least some additional text in the displayed zoomed content in the second zoom scale;

based at least on the detecting the dragging movement on the displayed zoomed content in the second zoom scale, selecting the additional text in the displayed zoomed content as an addition to the selected text;

detecting a removal of the single-finger single touch; and at least in response to the detecting the removal, zooming out on the page of content to the first zoom scale;

wherein the performing the page zoom comprises:
based on a location of the single-finger single touch on the touch screen, displaying the selected text such that the selected text is located as zoomed under the location of the single finger single touch on the touch screen;

so that through a single-finger single touch, a page zoom and selection of multiple characters of text is performed while continuous contact with the touch screen is detected.

2. The method of claim 1, wherein the page of content comprises editable text.

3. The method of claim 1, wherein the single-finger single touch activates a cursor placement tool that comprises a cursor, and the method further comprises:
at least in response to the detecting the dragging movement of the single-finger single touch, relocating the cursor in editable text displayed in the touch screen.

4. The method of claim 3, wherein the performing the page zoom comprises displaying a text edit box such that the text edit box is located in the display of the touch screen based on a location of the single-finger single touch on the touch screen.

5. The method of claim 1, wherein the page zoom is centered from an area of the touch screen based on a location of the contact.

6. The method of claim 1, wherein the page of content is rendered at least using an application; and
zooming system content based on the detecting the single-finger single touch, the system content rendered by an operating system.

7. The method of claim 1, wherein the single-finger single touch comprises a continuous contact with the touch screen that is moving along the touch screen.

8. The method of claim 1, wherein an amount of scrolling depends on a position of the single-finger single touch relative to the predetermined boundary.

9. The method of claim 1, wherein a direction of scrolling depends on a direction of the dragging movement of the single-finger single touch.

10. A computing device comprising a processor and memory, the memory comprising computer-executable instructions which when executed by the processor cause the computing device to perform a method, the method comprising:
selecting text on a touch screen displaying at least a page of content, wherein the selecting comprises a gesture that contacts the touch screen and then is removed;
after the selection of the text, detecting a continuous contact of a single-finger single touch on the touch screen, the single-finger single touch being on the selected text displayed in the page of content;
based at least on the detecting the single-finger single touch, performing a page zoom, wherein the performing the page zoom produces at least displayed zoomed content;
detecting a dragging movement of the continuous contact on the displayed zoomed content;
based at least on the detecting the dragging movement of the continuous contact, scrolling to display at least some text not in the previously displayed zoomed content when the continuous contact is near an edge of the displayed zoomed content;
based at least on the detecting the dragging movement of the continuous contact on the displayed zoomed content, relocating the cursor in text displayed in the zoomed content so that multiple characters of the text are selected in the displayed zoomed content that were not previously selected;
detecting a removal of the single-finger single touch; and
based at least on the detecting the removal, zooming out on the page of content;
wherein the performing the page zoom comprises:
based on a location of the single-finger single touch on the touch screen, displaying the selected text as zoomed under the single finger single touch on the touch screen.

11. The computing device of claim 10, wherein the performing the page zoom comprises displaying a text edit box such that the text edit box is located in the display of the touch screen based on a location of the single-finger single touch on the touch screen.

12. The computing device of claim 10, wherein the single-finger single touch comprises a continuous contact with the touch screen that is moving along the touch screen.

13. The computing device of claim 10, wherein the page of content is rendered at least using an application; and
zooming system content based on the detecting the single-finger single touch, the system content rendered by an operating system.

14. The computing device of claim 10, wherein an amount of scrolling depends on a position of the continuous contact relative to the edge of the displayed zoomed content.

15. The computing device of claim 10, wherein a direction of scrolling depends on a direction of the dragging movement of the continuous contact.

16. A nonvolatile computer-readable storage medium storing computer-executable instructions which when executed cause a computing device to perform a method, the method comprising:
selecting text in a page of content displayed in a touch screen with a gesture that temporarily contacts the touch screen;
detecting a subsequent single-finger single touch with the touch screen initiated on the selected text, the single-finger single touch comprising a continuous contact with the touch screen;
based at least on the detecting the single-finger single touch, performing a page zoom to produce at least displayed zoomed content on the touch screen;
detecting a dragging movement of the continuous contact on the displayed zoomed content;
in response to the continuous contact reaching a predetermined boundary of the displayed zoomed content, scrolling to display revealed text not previously displayed in the touch screen, wherein a direction of scrolling depends on a direction of the dragging movement, and wherein an amount of scrolling depends on a position of the continuous contact relative to the predetermined boundary;

based at least on the detecting the dragging movement on the displayed zoomed content, selecting, in the displayed zoomed content, at least a portion of the revealed text, wherein the revealed text includes multiple characters;

so that the performed page zoom and the selection of the multiple characters occur while continuous contact of the touch screen is detected;

detecting a removal of the single-finger single touch; and based at least on detecting the removal of the single-finger single touch, zooming out at least on the page of content;

wherein the performing the page zoom comprises:
    based on a location of the single-finger single touch on the touch screen, displaying the selected text such that the selected text is located in the touch screen as zoomed under the location of the single finger single touch on the touch screen as the single finger single touch maintains the continuous contact with the touch screen.

\* \* \* \* \*